United States Patent
Davenport et al.

(10) Patent No.: US 7,154,403 B2
(45) Date of Patent: Dec. 26, 2006

(54) APPARATUS AND METHOD FOR MONITORING THE OUTPUT OF A WARNING OR INDICATOR LIGHT

(75) Inventors: David Davenport, Niskayuna, NY (US); Daniel Stevens, Grain Valley, MO (US); Stephen David Utterback, Odessa, MO (US)

(73) Assignee: General Electric Company, Niskayuna, NY (US)

( * ) Notice: Subject to any disclaimer, the term of this patent is extended or adjusted under 35 U.S.C. 154(b) by 398 days.

(21) Appl. No.: 10/882,033

(22) Filed: Jun. 30, 2004

(65) Prior Publication Data

US 2006/0001547 A1  Jan. 5, 2006

(51) Int. Cl.
*G08B 21/00* (2006.01)

(52) U.S. Cl. ............... 340/641; 340/600; 340/907; 246/473 R; 250/205

(58) Field of Classification Search ............... 340/641, 340/600, 907, 639, 640, 642, 458, 643; 246/473 R, 246/125; 250/205; 351/132
See application file for complete search history.

(56) References Cited

U.S. PATENT DOCUMENTS

| | | | |
|---|---|---|---|
| 6,157,322 A * | 12/2000 | Anderson | 340/903 |
| 6,222,446 B1 | 4/2001 | Hilleary | 340/458 |
| 6,369,704 B1 | 4/2002 | Hilleary | 340/458 |
| 6,455,839 B1 * | 9/2002 | O'Connor et al. | 250/221 |
| 6,688,561 B1 | 2/2004 | Mollet et al. | 246/473.1 |
| 2002/0190855 A1 * | 12/2002 | Bone | 340/527 |
| 2004/0056199 A1 * | 3/2004 | O'Connor et al. | 250/341.1 |
| 2004/0119587 A1 | 6/2004 | Davenport et al. | 340/538 |

OTHER PUBLICATIONS

Texas Instruments, A Single-Supply OP-Amp Circuit Collection, Application Report SLOA058-Nov. 2000, by Bruce Cartr, pp. 1-26.
Illumination Fundamentals, Lighitng Research Center, by Alma E.F. Taylor, 2000, pp. 1-46.

* cited by examiner

*Primary Examiner*—Jeffery Hofsass
*Assistant Examiner*—Sisay Yacob
(74) *Attorney, Agent, or Firm*—Paul J. DiConza; William E. Powell, III

(57) ABSTRACT

An operational status detection system for a railroad warning device having a warning light, comprising: a photodiode configured to generate a signal corresponding to a light output of the warning light of the railroad warning device; an amplifier for increasing a signal strength of the signal and providing an output corresponding to the signal; a filter for receiving the output, the filter being configured to only allow portions of the output corresponding to the light output of the warning light to be presented as an output signal of the warning light; and a microcontroller receptive to the output signal and for comparing the output signal to a threshold value, the threshold value corresponding to an acceptable light output of the warning light.

39 Claims, 22 Drawing Sheets

Response from Incandescent Lamp

Response from Harmon LED Lamp

First Order High Pass Filter with Unity Gain

Amplitude Response for First Order High Pass Filter (-20 dB/decade, -6 dB/octave)

First Order High Pass Filter with Unity Gain

Incandescent Lamp Photo Sensor Output and First Order

LED Lamp Photo Sensor Output and First Order

FIG. 13
Single Supply First Order High Pass Filters
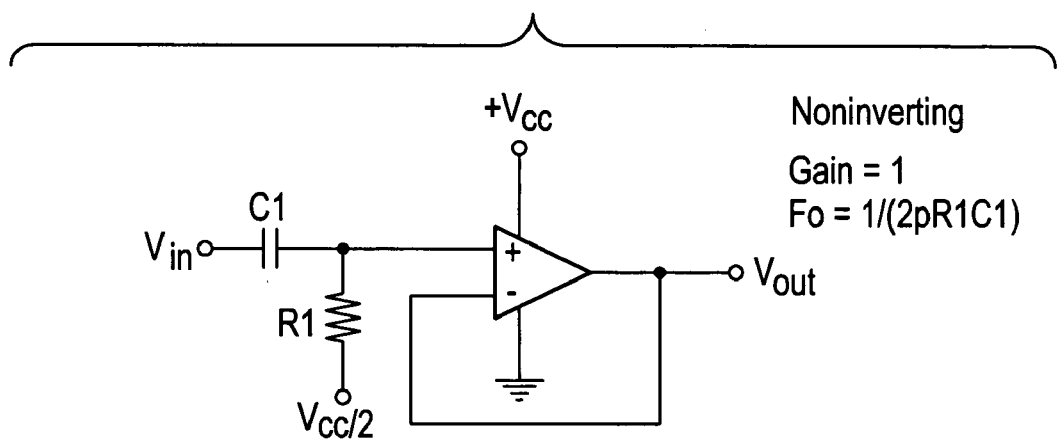
Noninverting
Gain = 1
Fo = 1/(2pR1C1)
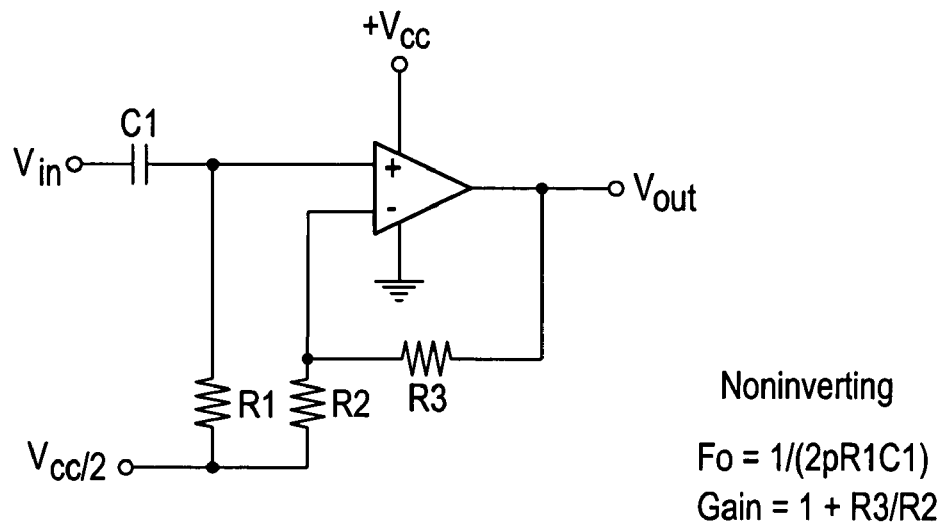
Noninverting
Fo = 1/(2pR1C1)
Gain = 1 + R3/R2

Prototype Sensor Circuit Built & Evaluated

FIG. 17
Photo Sensor Circuit
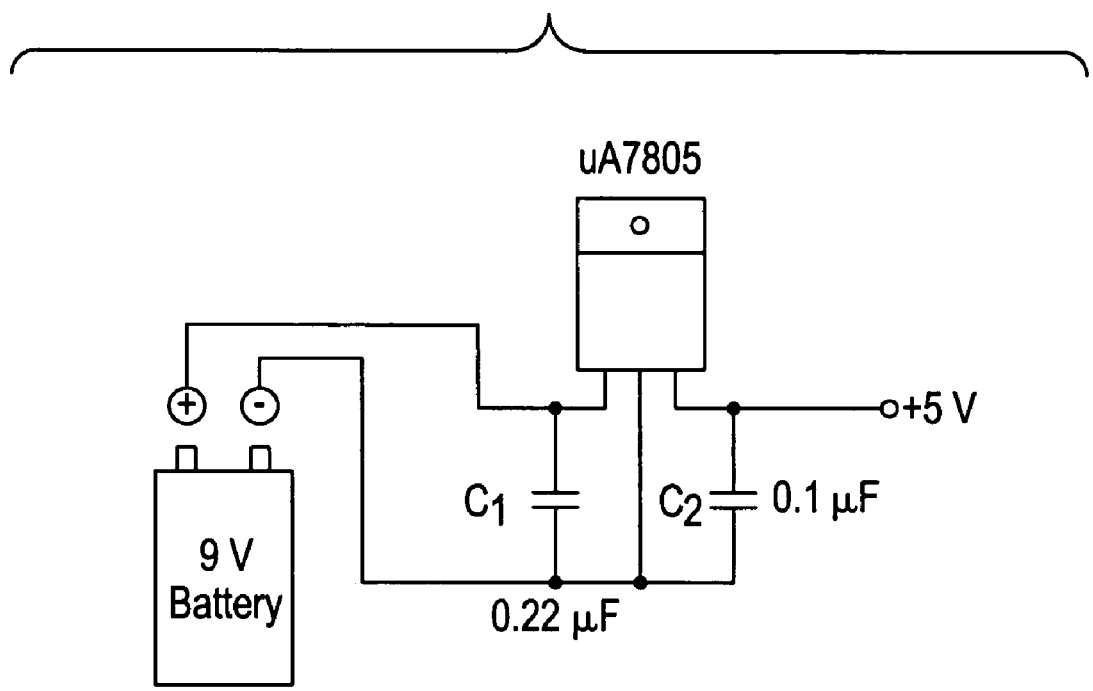
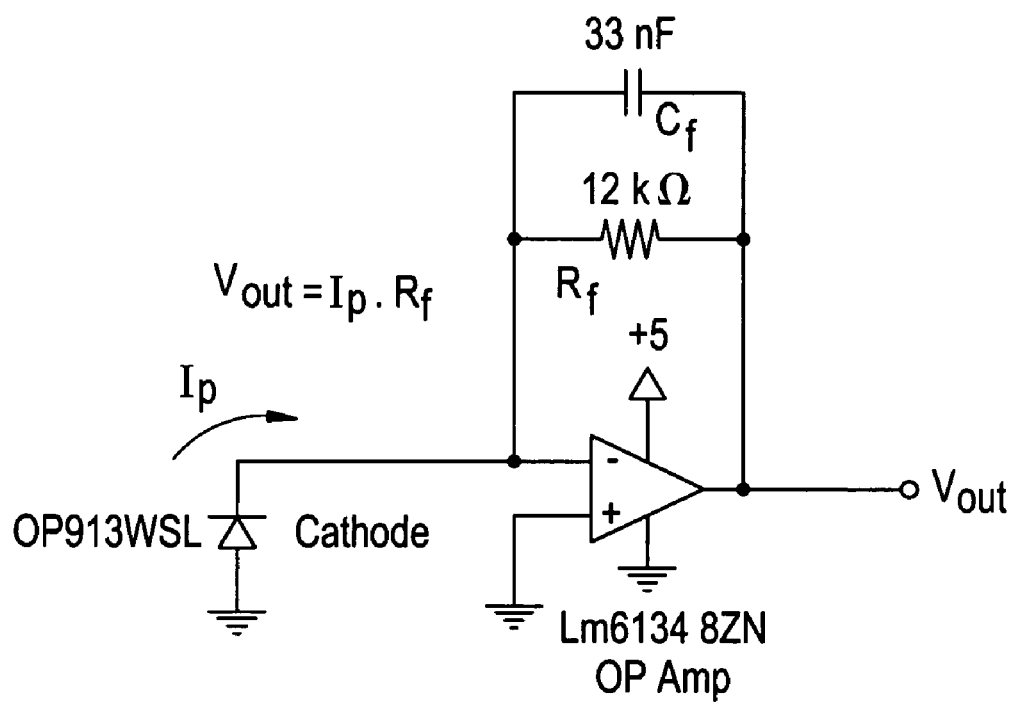

FIG. 18

Photo Sensor Statistics

| Channel | Mean (Volts) | Standard Deviation (Volts) | Maximum (Volts) |
|---|---|---|---|
| Lamp 1 | 2.64 | 0.009 | 2.677 |
| Lamp 2 | 2.56 | 0.009 | 2.594 |
| Lamp 3 | 0.774 | 0.258 | 1.011 |
| Lamp 4 | 0.850 | 0.309 | 1.172 |

Comparison of Bird Model Monte Carlo and 24 Oct Field Data

Comparison of Bird Model Monte Carlo and 28 Oct Field Data

Comparison of Bird Model Monte Carlo and 21 Nov Field Data

Sensitivity Analysis Bird Model Total Photo Current (Diffuse, Ground and Direct) Photo Current from 28 October Monte Carlo Simulation Power Spectral Density Estimate of October 24 Time Series Power spectral Density Estimate of October 28 Time Series

APPARATUS AND METHOD FOR MONITORING THE OUTPUT OF A WARNING OR INDICATOR LIGHT

BACKGROUND

This invention relates generally to railroad crossing and wayside signals, and more particularly a method and apparatus for monitoring the operational status of the railroad crossing signal.

Railroad systems include wayside equipment such as switches, signals, and vehicle detectors including hot wheel detectors, dragging equipment detectors, high/wide load detectors, vehicle identification systems, etc. Such equipment must necessarily be located throughout the railroad system, and is thus geographically dispersed and often located at places that are difficult to access. Systems are currently in use for communicating operational and status information relating to the condition of the train or the track to control centers through various types of modems. For example, position indicators are provided on switches and a signal responsive to the position of a switch is communicated to a control center for that section of track.

Grade crossings where streets and railroad tracks intersect are provided with various types of warning systems and/or indicators that are used to alert pedestrians and roadway vehicle operators to the presence of an oncoming train. Passive warning systems include signs and markings on the roadway that indicate the location of the crossing. Active warning systems include the audible signal from a locomotive horn as well as various types of wayside warning devices, which are activated as the train approaches. The grade crossing warning devices may include visual and audible alarms as well as physical barriers. A typical crossing in an urban area may include signs painted onto the roadway and/or erected at the crossing and a fully automatic gate device with flashing lights and bells for blocking all lanes of roadway traffic.

Regular monitoring and maintenance of the grade crossing warning systems and equipment ensures proper operation of the device. Moreover, the Federal Railroad Administration mandates regular and periodic inspection of railroad-highway grade crossing warning systems. In order to perform such tasks, routine maintenance and inspections are performed on grade crossing warning equipment. In order to conduct such inspections an inspector will visit the site of each crossing periodically to inspect the equipment and to confirm its proper operation. In order to assist in the monitoring and maintenance of these systems remote or automatic sensing devices may be employed to provide signals indicative of the operation status of the system. Examples of such systems and devices are found in U.S. Pat. Nos. 6,222,446 and 6,688,561 and U.S. patent application Ser. No. 10/248,120 the contents of which are incorporated herein by reference thereto.

One of the items of the grade crossing warning equipment requiring monitoring is the operational status of the warning lights. In order to detect the operation status of the warning light a sensor or photo sensor is positioned to measure the output of the warning light. However, the location of the sensor or photo sensor may cause the sensor to be exposed to environmental conditions that may affect the accuracy of the sensor output. Furthermore, and in order to not block the light output while also measuring the same the sensor may be positioned such that it will detect a non-uniform light signal (e.g., the sensor is not centrally located with respect to the light).

The development of an external sensor for monitoring the output irradiance of a railroad crossing flashing light must consider the influence of ambient sunlight. Direct solar rays may be reflected off the ground or lamp face (i.e., lens or roundel) and detected by a photo sensor. This reflected sunlight may lead to saturation of the photo sensor. Saturation would preclude the quantification of flashing light output irradiance and reduce the availability of the photo sensor. Accordingly, it is desirable to provide a method and apparatus for monitoring the operational status of the railroad crossing signal, which accounts for environmental conditions as well as sensor position.

SUMMARY OF THE INVENTION

A sensor for monitoring the output irradiance of a railroad crossing flashing lamp that considers the influence of ambient sunlight.

An operational status detection system for a railroad warning device having a warning light, comprising: a photodiode configured to generate a signal corresponding to a light output of the warning light of the railroad warning device; an amplifier for increasing the signal strength of the signal and for providing an output corresponding to the signal; a filter for receiving the output, the filter being configured to only allow portions of the output corresponding to the light output of the warning light to be presented as an output signal of the warning light; and a microcontroller receptive to the output signal and for comparing the output signal to a threshold value, the threshold value corresponding to an acceptable light output of the warning light.

An operational status detection system for a warning light of a railroad warning device, the detection system comprising first stage sensor electronics which convert photo current of a photodiode to voltage for subsequent processing without saturation by ambient sunlight and second stage sensor electronics which provides a high pass filter to separate desired, alternating warning light photo current signal components from DC and near-DC photo current components from ambient sunlight.

An operational status detection system for a railroad warning device having a warning light, comprising: a plurality of photodiodes disposed in front of the warning light, each of the plurality of photodiodes being configured to generate a signal corresponding to a light output of the warning light of the railroad warning device; a filter circuit for each of the plurality of photodiodes, each filter circuit comprising an amplifier for increasing a signal strength of the signal and providing an output corresponding to the signal, a high pass filter for receiving the output, the high pass filter being configured to only allow portions of the output corresponding to the light output of the warning light to be presented as an output signal of the warning light; and a microcontroller receptive to the output signal of each filter circuit and for comparing the output signals to a threshold value, the threshold value corresponding to an acceptable light output or range of outputs of the warning light.

A method for remotely monitoring a light output of a warning light of a railroad crossing warning system, comprising: sampling the light output of the warning light with a photodiode, the photodiode generating a signal corresponding to the output current of a photodiode; filtering the signal corresponding to the output current with a filter, wherein ambient sunlight is filtered from the signal corresponding to the output current to provide a filtered signal; comparing the filtered signal to an acceptable threshold value to generate an operational status signal; and providing the operational status signal to a remote monitoring system.

A warning light for a railroad crossing, comprising: a housing for a light emitting device; a roundel secured to the housing, the roundel being positioned in front of the light emitting device to provide an illuminated surface of the warning light; a shroud extending from the housing and the roundel; a sensor secured to the shroud and being positioned to detect light from the illuminated surface wherein the sensor is configured to provide an operational status signal of the warning light, the sensor comprising; a photodiode configured to generate a signal corresponding to a light output of the illuminated surface; an amplifier for increasing a signal strength of the signal and providing an output corresponding to the signal; a filter for receiving the output, the filter being configured to only allow portions of the output corresponding to the light output of the illuminated surface to be presented as an output signal of the warning light; and a microcontroller receptive to the output signal and for comparing the output signal to a threshold value, the threshold value corresponding to an acceptable light output of the illuminated surface.

BRIEF DESCRIPTION OF THE DRAWINGS

FIG. 13 is a schematic of a first order active filter circuit for use in exemplary embodiments of the present invention;

FIG. 17 is a schematic of a photo sensor circuit with the filtering circuitry of exemplary embodiments of the present invention FIG. 18 is a table illustrating results of the graphs of FIG. 16;

DETAILED DESCRIPTION OF EXEMPLARY EMBODIMENTS OF THE INVENTION

Disclosed herein is an operational status detection system for a railroad warning device having a warning light. The system will remotely provide a signal indicative of the operational status of the warning light. The system includes a photodiode configured to generate a signal corresponding to light output of the warning light of the railroad warning device when the device is activated. The signal is filtered to only allow portions of the signal corresponding to the light output of the warning light to be presented as an output signal of the warning light. More specifically, and in accordance with exemplary embodiments, the ambient sunlight that may be received by the photodiode is filtered out from the signal. The filtered signal is then received by a microcontroller which compares the output signal to a pair of threshold values corresponding to a range of an acceptable light output of the warning light. In this fashion, the system will be able to detect possible failure modes which may yield a decrease in light output as well as an increase in light output. Thus, the signal is compared to a pair of thresholds which define the "nominal" light values in the acceptable region. Thereafter, the microcontroller provides a signal indicative of the operational status of the warning light (e.g., light output ok or below or above an acceptable level). If the signal indicates that the light output is outside an acceptable range a maintenance crew is dispatched to determine the cause of the unacceptable light output, which may be due to a variety of items related to routine maintenance such as, a burned out lamp, a cracked lens or lamp roundel, debris on the lens of the warning light, etc. In addition, any one of these causes may occur at random thus, a remote monitoring system provides an almost immediate indication of a warning light having a low or high light output.

Figure 1:
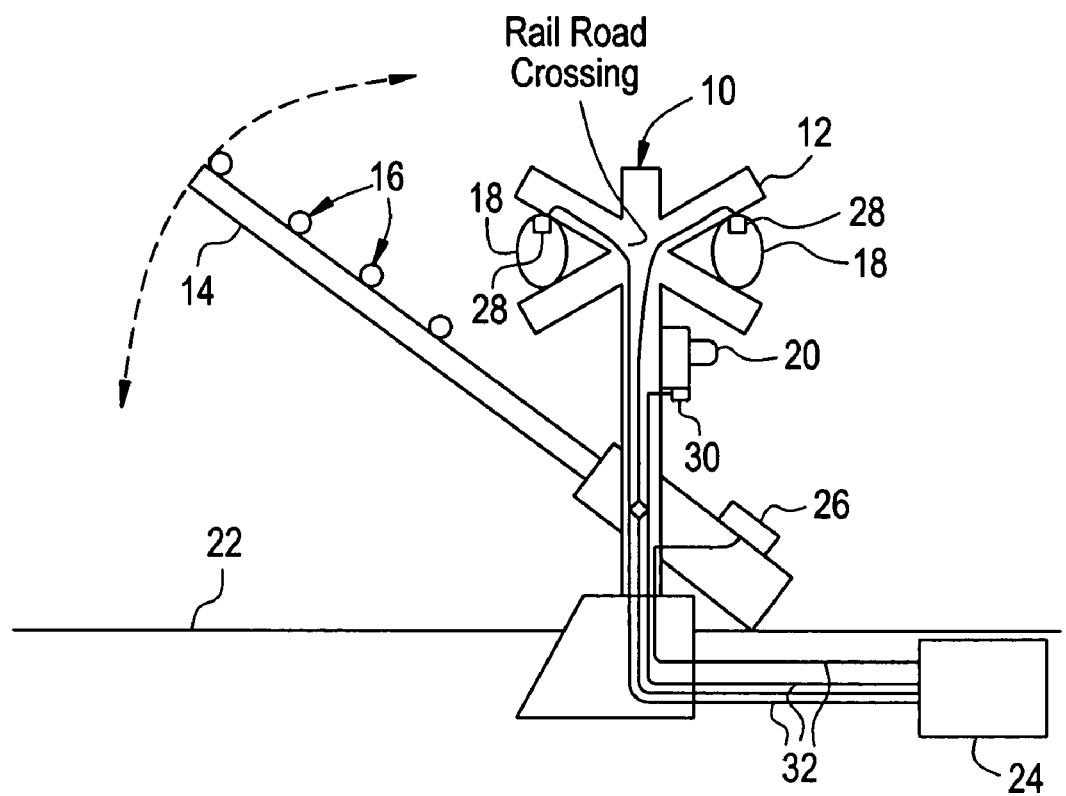
FIG. 1 is an illustration of a railroad warning device.

Referring now to FIG. 1, a non-limiting example of a railroad grade crossing signal post 10 is illustrated. In the illustrated embodiment, the railroad grade crossing signal post 10 comprises a sign 12 having the familiar cruciform shape, a swing gate 14 with attached lamps/reflectors 16, warning lights 18 and alarm bell 20. The position of the gate 14 and the operational status of the lamps/reflectors 16, warning lights 18 and alarm bell 20 are controlled in response to the proximity of a rail vehicle to the grade crossing 22. It is, of course, understood that the signal post may comprise one or more of the aforementioned items and the positioning of the same may vary. For example, the swing gate may be separately located from post 10 and the positioning of the lamps/reflectors 16, warning lights 18 and alarm bell 20 may vary.

During operation and prior to the arrival of an approaching rail vehicle (e.g. locomotive), the gate 14 is moved to a horizontal position and the lamps 16, warning lights 18 and bell 20 are all activated to block road vehicle traffic and to warn pedestrians and road vehicle operators of an approaching train.

In the illustrated embodiment, a wayside equipment box 24 is used to house the power and control components necessary for the operation of the various components of the signal post 10. Associated equipment may be located proximate to the grade crossing 22 in either direction for sensing the approach of a train and for initiating a warning configuration of the signal post 10. In order to provide the signal post with the proper signals for operation a plurality of sensors are provided to provide signals to the functional systems in order to automatically lower the gate and activate the lights etc.

Furthermore, and in order to determine if the warning systems are operating properly (e.g., a warning light is flashing when a signal of an oncoming train is received) a plurality of sensors are also provided to detect proper operation of the various components of the signal post 10. For example, a position sensor 26 is attached to the swing gate 14 for detecting when the gate 14 is in its upright and lowered positions. Position sensor 26 may take the form of a mercury level switch, one or more limit switches, an ultrasonic or infrared sensor, a potentiometer, or any other type of device useful for determining the position of the gate 14. A photo sensor 28 is located proximate to warning light 18 for detecting when light 18 is emitting a predetermined pattern of light energy. A sound detector 30 is located proximate to bell 20 for detecting when bell 20 is emitting a predetermined pattern of sound energy. Each of these sensors may be connected to associated power supplies, converters, amplifiers, microprocessors, etc. located in equipment box 24 via respective cables 32. Alternatively, the associated power supplies, converters, amplifiers, micropro- cessors, etc. are located proximate to the sensor. Further- more, the signals of the operational sensors are stored in memory or immediately sent to a monitoring station in order to indicate whether maintenance of the system is required.

Figure 2:
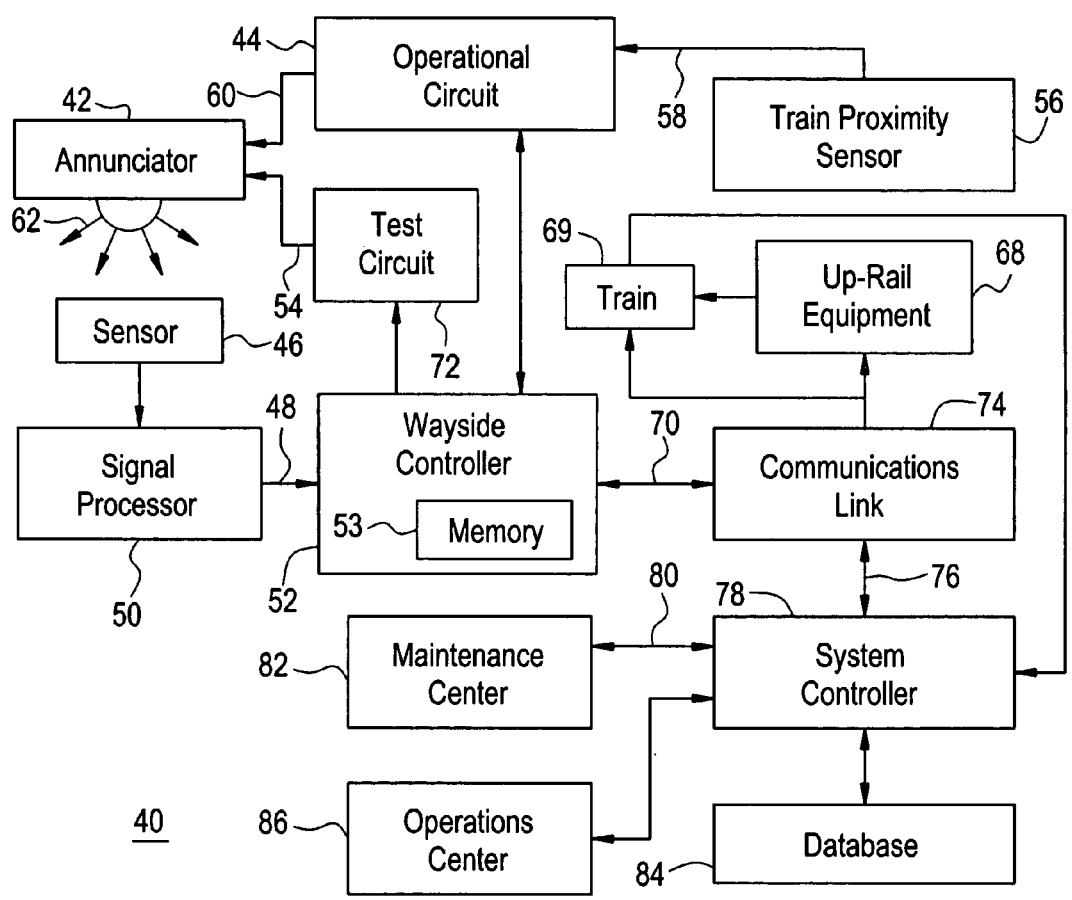
FIG. 2 is a schematic illustration of a system for providing remote monitoring of a railroad warning device.

The components illustrated in FIG. 1 form part of a grade crossing equipment monitoring system 40, which is further illustrated in the functional diagram of FIG. 2. A grade crossing annunciator 42 in its general configuration may be any of those known in the art, which includes but is not limited to the following items such as swing gate 14, lamp/reflector 16, warning light 18 or alarm bell 20. An operational circuit 44 for delivering a warning of an approaching rail vehicle controls the annunciator 42. A train proximity sensor 56 is located along a rail line to sense the approach of a rail vehicle to a grade crossing location. Upon receipt of a train proximity signal 58 from train proximity sensor 56, the operational circuit 44 provides an alarm signal 60 to annunciator 42. Annunciator 42 functions to emit a predetermined output 62, such as sound emitted from a bell or light emitted from lamps 16 or 18 or tilting movement of gate 14. A sensor 46 is used to detect the output 62 of annunciator 42 and to provide a sensor signal 48 responsive to the operation of the annunciator 42. A signal processor 50 such as an amplifier, filter, converter, etc. may be used to place sensor signal 48 in a form suitable for input to a controller 52.

Controller 52 may be of any type known in the art for implementing the operations described below. Controller 52 may be located at the grade crossing location 22, such as within a wayside equipment box 24 proximate the grade crossing signal post 10. In exemplary embodiments control- ler 52 and/or equivalent devices are used to operate the signal post as well as provide information indicative of the operation of the various components of the signal post. For example, the controller or and/or equivalent devices may comprise among other elements a microprocessor, read only memory in the form of an electronic storage medium for executable programs or algorithms and calibration values or constants, random access memory and data buses for allow- ing the necessary communications (e.g., input, output and within the microprocessor) in accordance with known tech- nologies.

It is understood that the processing of the above descrip- tion may be implemented by a controller operating in response to a computer program. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

As described above, algorithms for implementing exem- plary embodiments of the present invention can be embod- ied in the form of computer-implemented processes and apparatuses for practicing those processes. The algorithms can also be embodied in the form of computer program code containing instructions embodied in tangible media, such as floppy diskettes, CD-ROMs, hard drives, or any other com- puter-readable storage medium, wherein, when the computer program code is loaded into and executed by a computer and/or controller, the computer becomes an apparatus for practicing the invention. Existing systems having repro- grammable storage (e.g., flash memory) that can be updated to implement various aspects of command code, the algo- rithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer pro- gram code is loaded into and executed by a computer. When implemented on a general-purpose microprocessor, the com- puter program code segments configure the microprocessor to create specific logic circuits.

These instructions may reside, for example, in RAM of the computer or controller. Alternatively, the instructions may be contained on a data storage device with a computer readable medium, such as a computer diskette. Or, the instructions may be stored on a magnetic tape, conventional hard disk drive, electronic read-only memory, optical stor- age device, or other appropriate data storage device. In an illustrative embodiment of the invention, the computer- executable instructions may be lines of compiled C++ compatible code.

In an exemplary embodiment controller 52 includes logic for evaluating sensor signal 48 to determine if annunciator 42 is performing properly. For example, if annunciator 42 is a flashing warning light the sensor may comprise a photo- diode proximate to the warning light to detect the light output of the warning light in order to provide a signal indicative of the performance of the warning light. The signal 48 provided by such a sensor 46 may be processed and recorded by controller 52 to develop information 70 regarding the operating status of annunciator 42. That infor- mation 70 may take the form of a simple go/no-go decision wherein proper anti improper performances are differenti- ated. Alternatively, more robust information 70 may be developed depending upon the type of annunciator 42 being monitored and the sophistication of the sensor 46 and logic performed by controller 52. For example, a history of performance data may be recorded with future performance being predicted on the basis of the data trend.

Alternatively if annunciator 42 is a bell, the sensor 46 may be a microphone placed proximate the bell or a solid-state accelerometer attached to the bell housing or other structure mechanically connected to the bell and vibrating therewith. For audio performance data, the information 70 may include volume, frequency, and pattern of sound verses time. For visual performance data, the information 70 may include wavelength, intensity and pattern of light verses time. If the annunciator 42 is a level sensor 26 for a swing gate 14, the information 70 may include the angle at stop positions and speed of angle change during movement verses time. One may appreciate that the information 70 to be developed would preferably be directly responsive to known failure modes and performance characteristics of the particular type of annunciator 42 being monitored.

Information 70 regarding the performance of annunciator 42 may be developed each time annunciator 42 is energized by operational circuit 44 and/or it may be developed periodically in accordance with a schedule. The schedule of monitoring may, itself, be made responsive to the information 70 in the event that indications of sensor degradation are detected. A special test circuit 72 may be provided to operate the annunciator 42 in a test mode, such as to exercise annunciator 42 in a manner or on a schedule that is not possible with operational circuit 44. To detect possible intermittent failures, data may recorded each time that the annunciator 42 operates, and the schedule of this data may be compared to the schedule of trains passing the grade crossing. An intermittent failure may be identified by an occasional difference between these two schedules. The test circuit 72 may be responsive to the information 48 developed during a previous operation of annunciator 42. For example, should the information 48 be interpreted by controller 52 as indicating the likelihood of a developing problem, the test circuit 72 may be instructed to perform a special test indicative of that developing problem. In one embodiment, a single indication of a malfunctioning annunciator bell or other device (e.g., warning light) may be detected by sensor 46. In order to determine if that single indication was simply spurious information or if it was truly indicative of a real problem with the device being monitored, the test circuit may be instructed by logic resident in controller 52 to produce a rapid series of test signals to determine if a particular device is operating properly. If the sensor 46 detects proper performance of the device during each of these tests, the single indication may be deemed to be a spurious indication. Such information may be recorded in memory 53 or other database for future reference in the event of other occurrences of seemingly spurious malfunctions.

Information 70 may be recorded and stored locally in a memory 53 for use by an inspector making periodic visits to the site of the crossing. Advantageously, the information 70 may be communicated to a location remote from the railroad crossing by a communications link 74. The term remote location is used herein to mean a location outside the immediate area of the grade crossing; for example a railway control center located one or many miles from the grade crossing. The remote location may alternatively be a service center having responsibility for inspecting and maintaining the grade crossing warning systems at a plurality of crossings. The remote location to which the information 70 is communicated will be located at a distance from the grade crossing that is greater than that of the approaching train.

Communications link 74 may take any form known in the art, such as a wireless, landline, and/or fiber optic communications device having a transmitter and a remote receiver. Communications link 74 may include and make use of access to the Internet 76 or other global information network. A remote central system controller 78, such as a computerized data processor operated by a railroad or rail crossing service provider, may receive the information 70 from the communications link 74. Information 70 may be received by the system controller 78 regarding a plurality of annunciators 42 at a plurality of crossings within a railroad network. The readiness of grade crossing warning equipment throughout the network may thus be easily and automatically monitored at a central location. Data regarding the make, model, location, installation date, service history, etc. of each annunciator 42 throughout the network may be maintained in a database 84 accessible by the system controller 78. The database 84 may also be updated to include performance information 70 from individual annunciators.

The storage of information 70 in database 84 would permit a trending analysis to be performed on the response of annunciator 42. For example, a change in the time between the delivery of a test signal 54 and the operation of annunciator 42 may be indicative of a developing problem. Early recognition of a change in the system characteristics may permit problems to be fixed before they result in a condition wherein the annunciator 42 fails to respond in a safe manner.

Communications link 74 may include communication equipment located on a passing train 69, so that the information 70 is conveyed from the grade crossing location 22 to the train 69 and then forwarded to a remote location by a transmitter located in the train. The communication to system controller 78 may be routed via the train 69 through a communications transmitter/receiver existing on the train 69 for other purposes. Alternatively, communications link 74 may communicate with up-rail equipment 68 such as a wayside signaling device so that appropriate warnings may be provided to trains 69 on the rail line regarding a malfunction of annunciator 42. Oncoming trains 69 may be signaled to stop or to proceed at a slow speed when an annunciator 42 is not working properly.

Malfunctions of the annunciator 42 may trigger a service request 80 that is forwarded to a maintenance center 82. The maintenance center 82 may be a stationary facility or a mobile repair center or combination thereof for providing equipment and personnel necessary for performing maintenance activities on the grade crossing warning equipment. Maintenance center 82 may also include a database for storing information related to such maintenance activities and data processing equipment for receiving information through the communications link 74 and for taking appropriate action to effect any appropriate maintenance activity related to the service request 80. The system controller 78 may generate the service request 80, or it may be generated as a result of cooperation between the system controller 78 and the maintenance center 82, or it may be generated by the maintenance center 82 alone. The service request 80 is responsive to annunciator-specific information from the database 84 as well as the malfunction-specific information 70. Personnel at the maintenance center 82 may then adequately prepare to accomplish the necessary repair, including the implementation of any equipment upgrades that may be necessary to bring annunciator 42 to current standards. The communication path between the maintenance center 82 and the wayside controller 52 may further be used to interrogate the wayside controller 52 and/or to deliver software of other forms of electronic data and information to the grade crossing equipment. In this manner, software located at a plurality of grade crossings throughout the railroad network may be conveniently upgraded from a central location. Video, audio and graphics links may also be established from the maintenance center 82 to the grade crossing location via this grade crossing equipment monitoring system 40 in order to assist the repairperson in making the necessary repairs and upgrades. An Internet or other multi-media communications link may be especially useful for this application to facilitate convenient access to the information by a plurality of interested parties and to facilitate two-way communication.

An operations center 86 may also receive notification of a malfunctioning annunciator 42. The operations center 86 may be the rail traffic control center for the railroad or other location having equipment and personnel necessary for controlling the operation of trains of a railroad. Upon learning of a malfunctioning annunciator 42, it may be appropriate to divert or slow traffic on certain portions of the rail system. The two-way communication provided by this grade crossing equipment monitoring system 40 may be used to augment the normal traffic control channels available to the railroad for responding to the notification of a failure of a grade crossing annunciator 42.

Automation of these inspections with sensors provides increased visibility into warning system performance and also provides productivity benefits for railroads. Railroad crossing flashing warning lights must be inspected on a monthly basis to confirm proper visibility of the lights for approaching motorists. This disclosure teaches a system and method for deploying a light sensor to monitor the light performance during each activation of the crossing warning system. Such a light sensor system should be mounted external to the flashing light head in order to capture the effects of lens damage, accumulated dirt and debris on the lens in addition to failure of the optical light source (incandescent bulb and reflector or LED array). Such an externally mounted light sensor will be subjected to ambient sunlight signals which may be much larger than light levels generated by the warning lamp.

Figure 3:
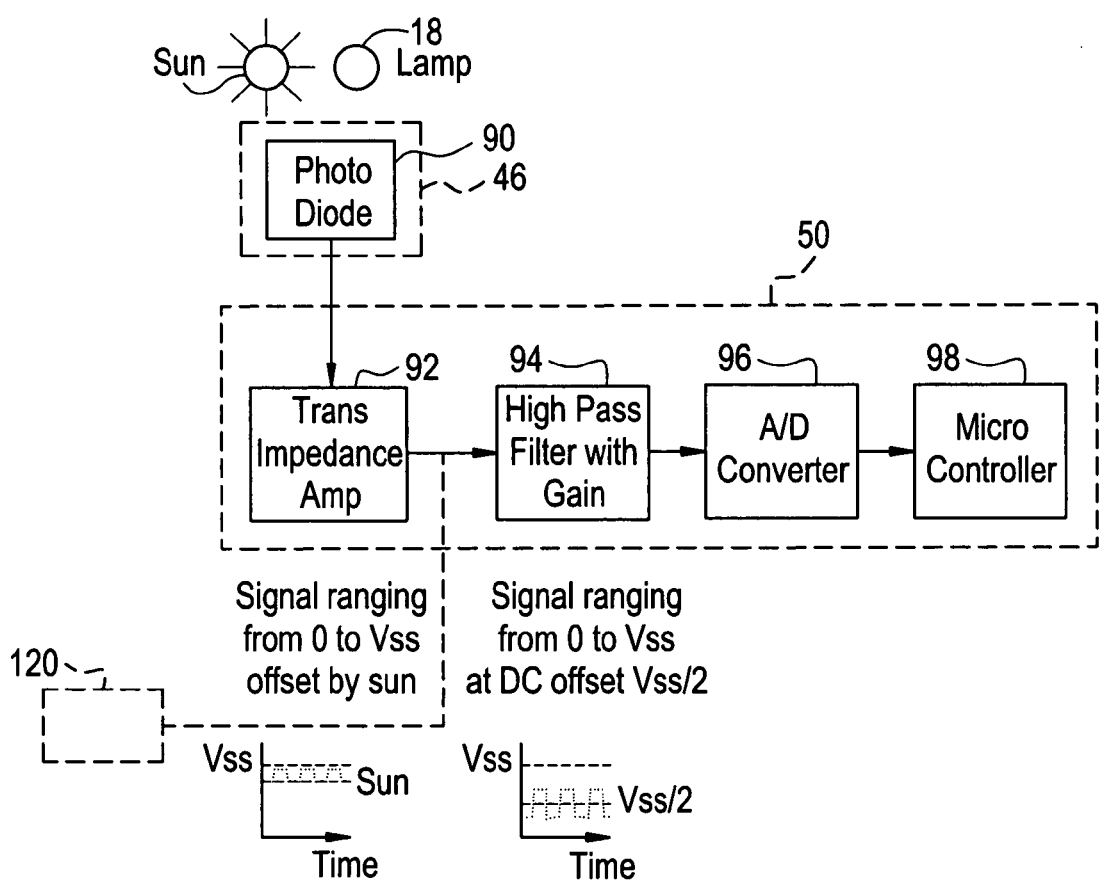
FIG. 3 is a schematic illustration of a monitoring system of an exemplary embodiment of the present invention.

Referring now to FIG. 3 a schematic illustration of an exemplary embodiment of the present invention is illustrated. Here a system for use with the sensor for monitoring the light energy output of the warning light 18 of the rail guide crossing system is illustrated. The illustrated system provides a sensor for monitoring the output irradiance of a railroad crossing flashing light that considers the influence of ambient sunlight since direct solar rays may be reflected off the ground or lamp face (i.e., lens or roundel) and detected by a photo sensor. This reflected sunlight may lead to saturation of the photo sensor and such saturation would preclude the quantification of flashing light output irradiance and reduce the availability or reliability of the photo sensor.

Empirical studies of field data has shown that sunlight signal components are less than 0.005 Hz. This data also shows that the direct sun rays at sunset during autumn are on the same order as reflected sunlight from the ground during early afternoon. In accordance with an exemplary embodiment and as shown in FIG. 3, with comparison to the system illustrated in FIG. 2, sensor 46 is a photodiode 90 positioned to measure the light output of warning lamp 18. The photodiode is positioned to monitor the output irradiance and frequency of the railroad crossing flashing light wherein the system will factor in the influence of ambient sunlight. It is understood that in addition to photodiodes, phototransistors or other equivalent devices may be used as the light intensity sensor in accordance with exemplary embodiments of the present invention.

A light intensity sensor (photodiode) is mounted external to the lamp head. An exemplary mounting location may include underneath a hood or shroud of the warning light. The light sensor has an acceptance angle and installation alignment, which affords a field of view including lamp surface and black background surface to reduce input of ambient light. The photodiode generates current, which is amplified and converted to a voltage via a trans-impedance amplifier. According to United States Federal Railroad Administration rules (Title 49, Part 234.217), railroad crossing warning lights flash alternatively at a minimum and maximum rate of 35 and 65 flashes per minute, respectively. These flash rates are equivalent to approximately 0.6 to 1.1 Hz. The first stage output voltage contains an alternating signal component from the flashing light (~0.6 to 1.1 Hz) device. This voltage output also contains a DC level and frequency components <0.1 Hz from ambient sunlight reflecting off the ground and structure and arriving at the photodiode input. The amplitude of the first stage amplifier is chosen such that this ambient sunlight will not saturate the output voltage range and mask the desired warning light alternating component. A second stage includes a high pass filter circuit. The high pass circuit can be either active or passive and this filter eliminates the DC and <0.1 Hz frequency components from sunlight and passes the desired 0.6 to 1.1 Hz varying signal from the warning lamp.

A micro controller having an analog-to-digital converter then samples the output of the second stage filter. The sampled output is compared to a threshold defined for minimum acceptable light levels. If the observed signal falls outside the thresholds defining acceptable performance, an alarm is recorded locally in the crossing equipment's data recorder. The alarm may also be conveyed to a remote monitoring center for subsequent action by railroad maintenance.

In principle, and in accordance with exemplary embodiments, the gain of first stage amplifier must be set to prevent saturation from ambient sunlight reflections and the high pass filter must be configured to remove the ambient sunlight levels.

As discussed above and referring now to FIG. 3, the signal processor 50 for use with photodiode 90 comprises the following elements; a trans impedance amplifier 92, a high pass filter 94 (with gain), a converter 96 and a micro-controller 98. In one embodiment micro-controller 98 comprises a portion of signal processor 50 or alternatively micro-controller 98 comprises a portion of controller 52.

As defined herein, a two-stage photo sensor with a trans-impedance amplifier and high pass filter are specified. Circuits of exemplary embodiments of the present invention afford resolution of incandescent and LED lamps having upper and lower specification limits in excess of 80 and 390 A/D counts, respectively. Moreover, this is accomplished without red color filtering of the incident light sources.

It is also contemplated that optical filtering of the input signal prior to its reception by the photodiode could be employed in accordance with exemplary embodiments of the present invention. In particular, red color filtering may be applied such that only the red light of the warning lamp reaches the photodiode. Optical filters which block infra red radiation wavelengths generated by incandescent lamp sources may also be blocked by an appropriate infra red cut filter. As applications require, it is also understood that other wavelengths may be blocked by the optical filter. Thus, portions of the visible spectrum, infrared radiation, ultraviolet radiation etc. can be filtered by appropriately configured filters. A non-limiting example of such other wavelengths include but are not limited to red, green, yellow and other possible colors for the lens of the warning light in addition to IR wavelengths, UV wavelengths and segments thereof. Non-limiting examples of possible ranges to be filtered or allowed to pass through the filter are described in Illuminating Fundamentals, Rensselaer Polytechnic Institute, 2000 the contents are which are incorporated herein by reference thereto, in particular reference is made to pages 7 and 8.

Accordingly, the application of an electronic, high pass filter provides a low complexity approach to mitigating the effects of ambient sunlight. A first order, high pass filter design provides required frequency separation with minimal settling time.

Figure 4A:
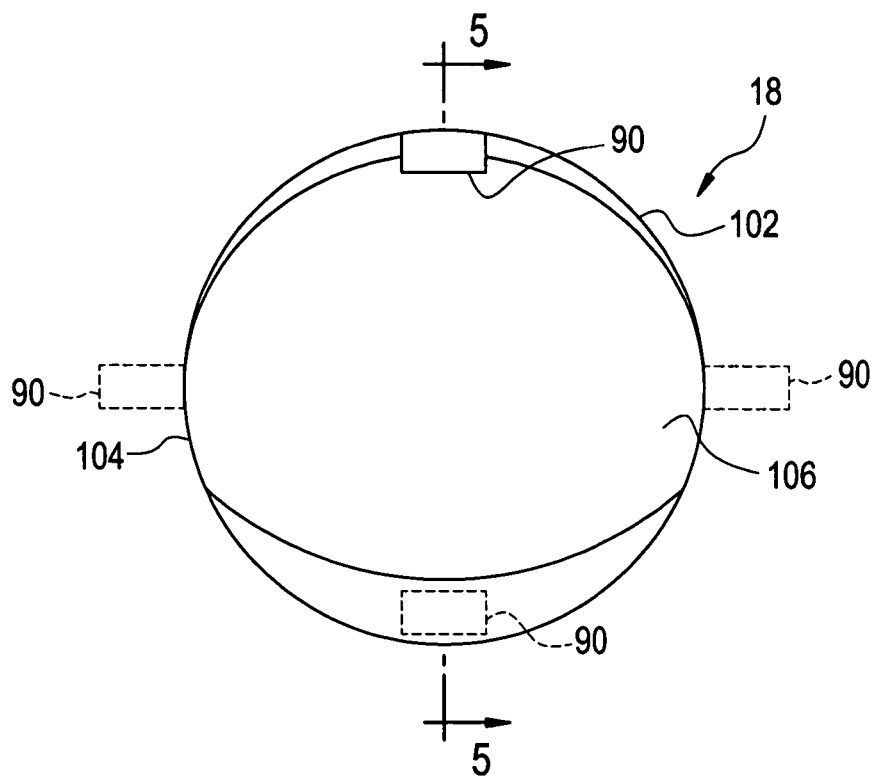
FIGS. 4a and 4b are front views of warning lights with monitoring systems in accordance with exemplary embodiments of the present invention.
Figure 4B:
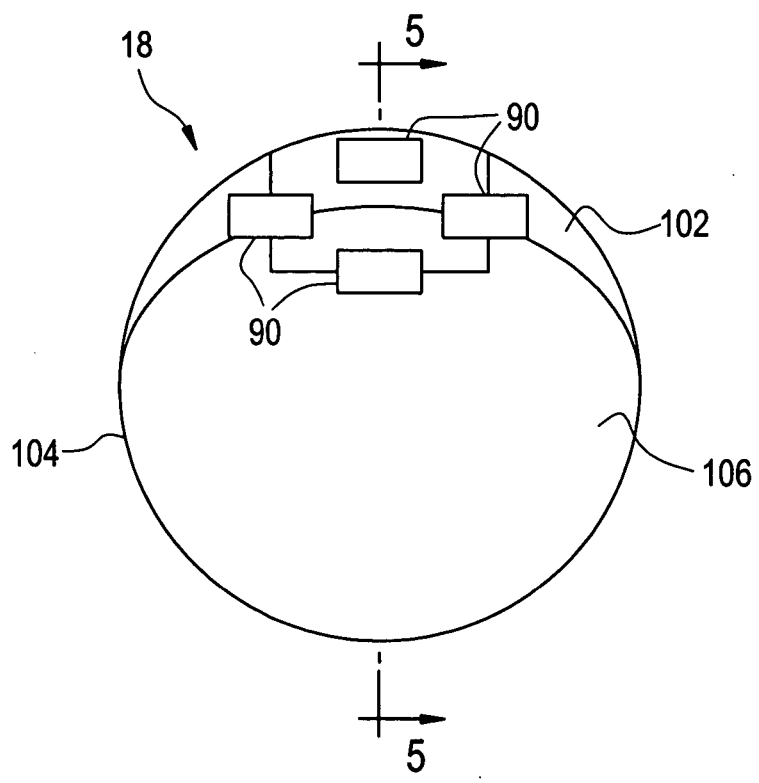
Figure 5:
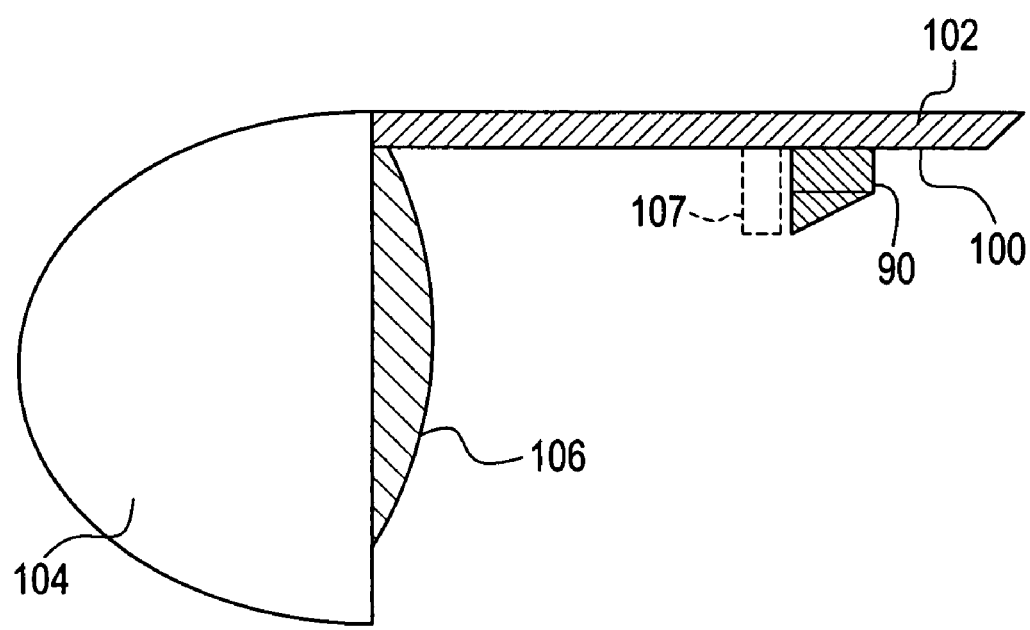
FIG. 5 is a view along lines 5—5 of FIG. 4.

Referring now to FIGS. 4 and 5, a warning lamp 18 with a photodiode 90 is illustrated. Here photodiode 90 is secured to an underside 100 of a hood 102. Hood 102 extends away from a lamp housing 104, which comprises a lens or lamp roundel 106 that covers a source of light for the warning lamp. As is known in the related arts lamp roundel may be colored to provide a desired light output (e.g., red, yellow, green, etc.). In an exemplary embodiment, photodiode 90 is angularly oriented towards the center of the lens 106. A non-limiting example of the distance of the photodiode from the lens is 8 inches with an angular orientation of 37 degrees down from the hood. It is, of course, understood that aforementioned values may be greater or less than those previously mentioned. In an alternative exemplary embodiment, a red filter 107 is disposed in front of the photodiode 90. As will be discussed herein filter 107 may be configured to optically filter numerous ranges of wavelengths corresponding to certain colors and others optical signals (e.g., Infrared light). For example, the filter may be configured to allow light having a wavelength in the range of about 650–780 nanometers.

In yet another alternative exemplary embodiment and as illustrated by the dashed lines in FIG. 4A, a plurality of sensors or photodiodes are positioned about the periphery of the warning lamp.

Figure 14A:
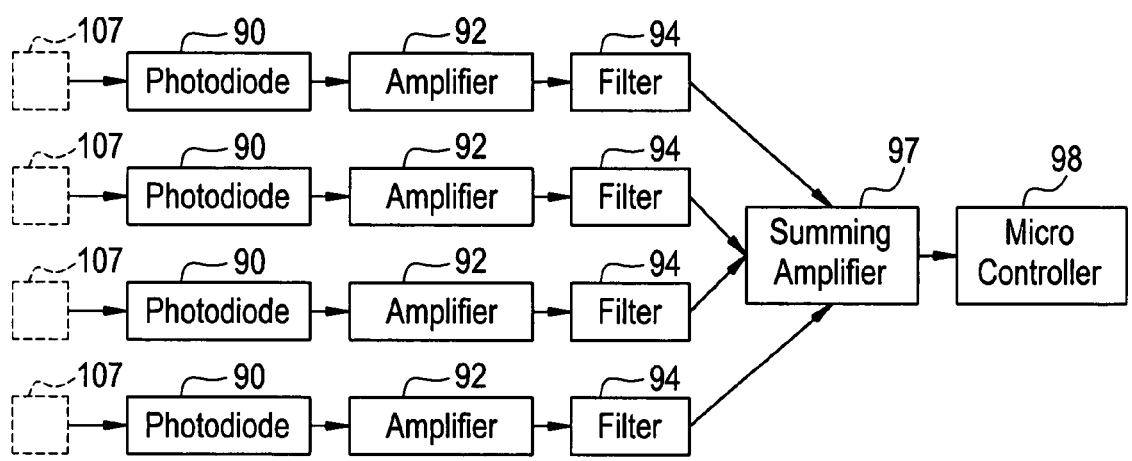
FIGS. 14A–14C are schematic illustrations of alternative filter circuits employing multiple diode configurations.
Figure 14B:
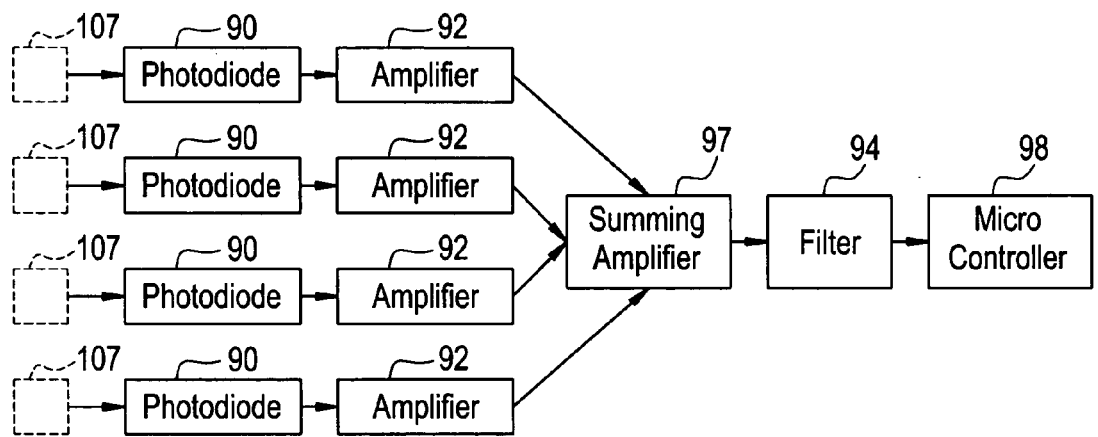
Figure 14C:
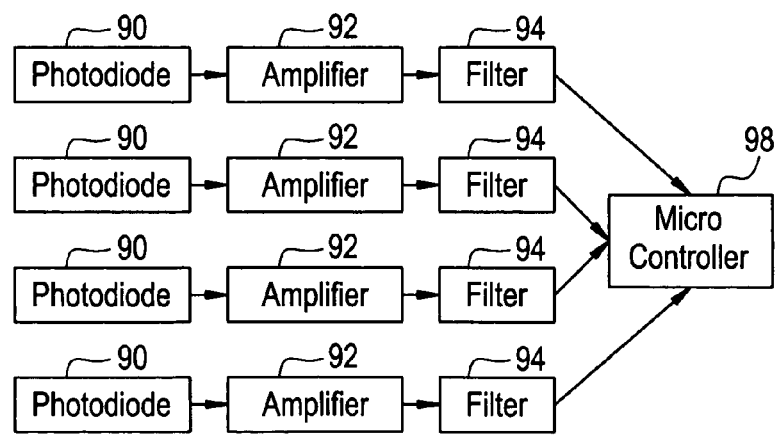

In yet another alternative exemplary embodiment and as illustrated by the dashed lines in FIG. 4B, a plurality of sensors or photodiodes are collocated on the hood but oriented such that they are pointing at specific regions of the roundel surface. The plurality of sensors or photodiodes are used to obtain a uniform response across the surface of the lamp surface, wherein each of the sensors are specifically biased to particular regions of the lamp face proximate to the sensor and each of the signals are appropriately weighted by for example a summing amplifier (FIGS. 14A–14C). Therefore, a uniform response across the lamp surface is attainable by using a plurality of sensors each configured to a particular area of the lamp face (e.g., some areas may be brighter than others due to the lamp bulb location or distribution of the LEDs). That is to say, changes in light output due to debris or damage can be detected independent of their placement on the lamp surface. Each sensor of the plurality may be sampled independent of the others and its output compared to nominal operation thresholds. In another embodiment, the outputs of the plurality of sensors may be summed into a single, composite signal. This composite signal could then be sampled and compared against predefined acceptance thresholds.

For example, and referring now to FIGS. 14A–14C alternative filter circuit arrangements are illustrated. In FIG. 14A a multiple photodiode approach for uniform spatial response is illustrated. Here individual channels each with their own photodiode 90, amplifier 92 and filter 94 provide a signal into a common summing amplifier 97 with single A/D converter in a single microcontroller 98. Thus, a proportional single of each of the photodiodes is provided to the microcontroller. Another multiple photodiode approach for uniform spatial response is illustrated in FIG. 14B. Here individual channels each with their own photodiode 90, amplifier 92 are fed to summing amplifier 97. Then the summed output of the summing amplifier is fed to a single filter and sampled by a single A/D converter in a microcontroller 98. In FIG. 14C another multiple photodiode approach for uniform spatial response is illustrated here individual channels each with their own photodiode 90, amplifier 92 and filter 94 provide signals to multiple A/D channels and the data is sampled by microcontroller 98. In this embodiment, each channel is compared to own acceptable thresholds (e.g., acceptable range or high to low values) or the channels are summed in microcontroller 98 and compared to the acceptable thresholds. In any of the aforementioned embodiments it is contemplated that an optical filter 107 as represented by the dashed lines may be positioned in front of the photodiode to provide optical filtering of the signal provided to the photodiode.

In an exemplary embodiment, the railroad crossing warning lamps are flashed at a rate between 35 and 65 flashes per minute corresponding to 0.58 to 1.08 Hz. As long as the initial, trans-impedance amplifier gain is chosen to avoid saturation, it is possible to separate the alternating flashing light response from the nearly constant ambient sunlight response. It is, therefore, possible to mitigate the effects of ambient sunlight by high pass filtering of the photo sensor output.

Figure 6:
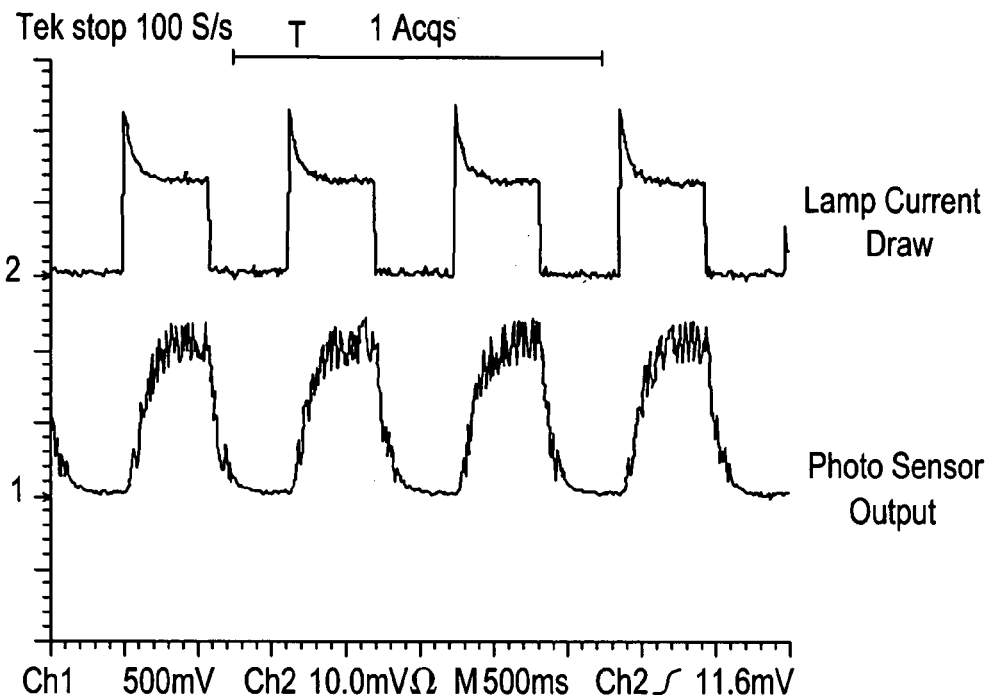
FIG. 6 is a graph illustrating data collected by a photodiode in response to the output of an incandescent lamp.
Figure 7:
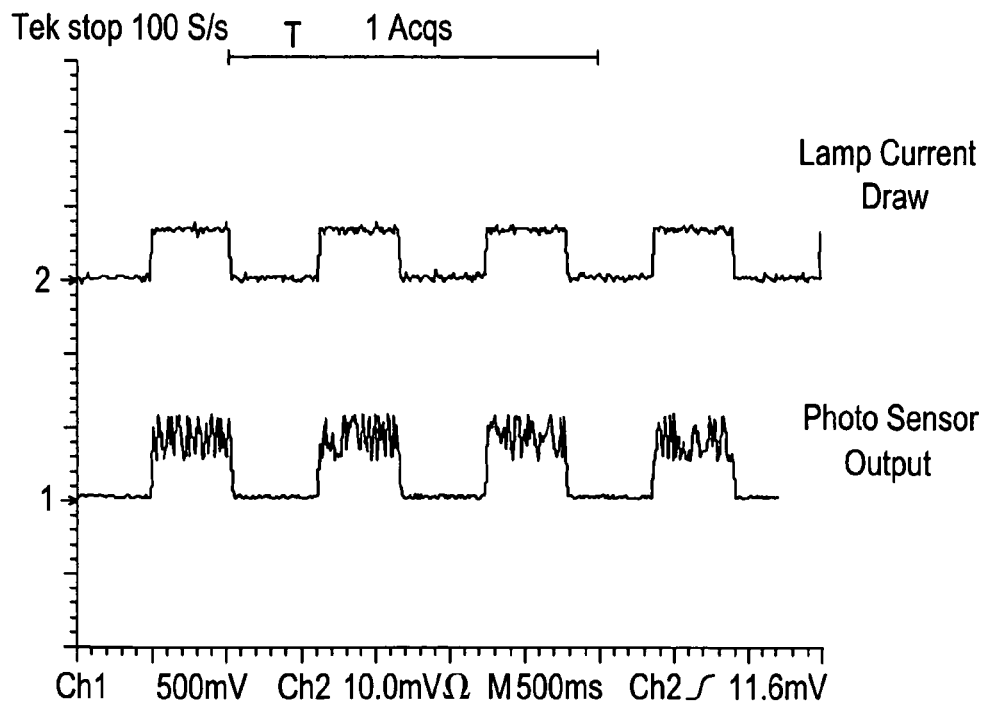
FIG. 7 is a graph illustrating data collected by a photodiode in response to the output of a LED lamp.

FIGS. 6 and 7 show empirical data collected with an Optek OP906 photodiode and a trans-impedance amplifier affording a voltage gain exceeding 200,000. The bottom trace in each Figure illustrates the voltage output of the photo sensor. Note that the time-varying signals shown will be offset with any constant current generated by the photodiode, i.e., dark current or ambient sunlight current. A Harmon XLC operating at 55 flash/minute was used to control these lamps when the data was collected.

Figure 8:
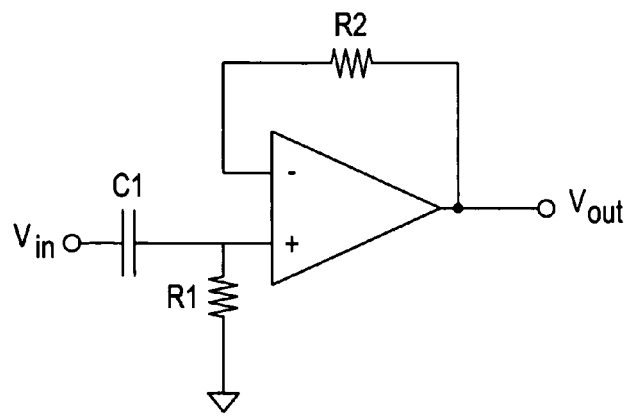
FIG. 8 is a schematic of a first order active filter for use in exemplary embodiments of the present invention.
Figure 9:
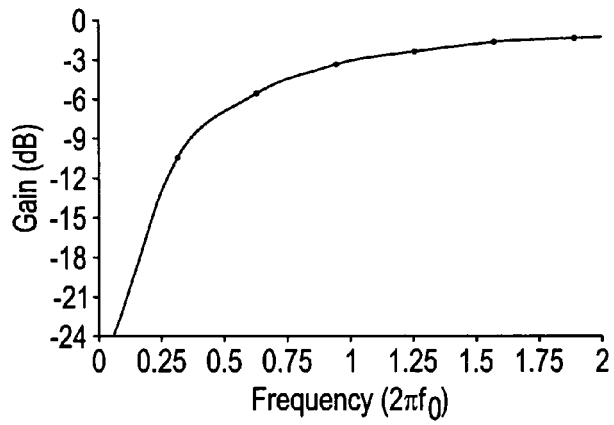
FIG. 9 is a graph illustrating an amplitude response of the first order active filter of FIG. 8.

A first-order active filter with unity gain is shown in FIG. 8. This filter affords −20 dB/decade or −6 dB/octave response as illustrated by the graph in FIG. 9. Values of R1 and C1 are calculated using the expression $f_0=1/(2\pi*R1*C1)$. Assuming a desired cut-off frequency, $f_0$, of 0.25 Hz, one non-limiting possible combination of passive components includes a 4.7 uF capacitor and 137 kOhm resistor.

Depending on the particular application and the lamps being used higher-order filters could be employed for additional attenuation and sharper cut-off response shape. However, higher filter order comes at the expense of settling time. The filter response exhibits a settling time which increases with filter order. This settling time serves as an initial delay interval. For example, and upon activation of the grade crossing system, the sensor output would not be applied to nominal operation region thresholds until the filter settling time had elapsed.

Figure 10:
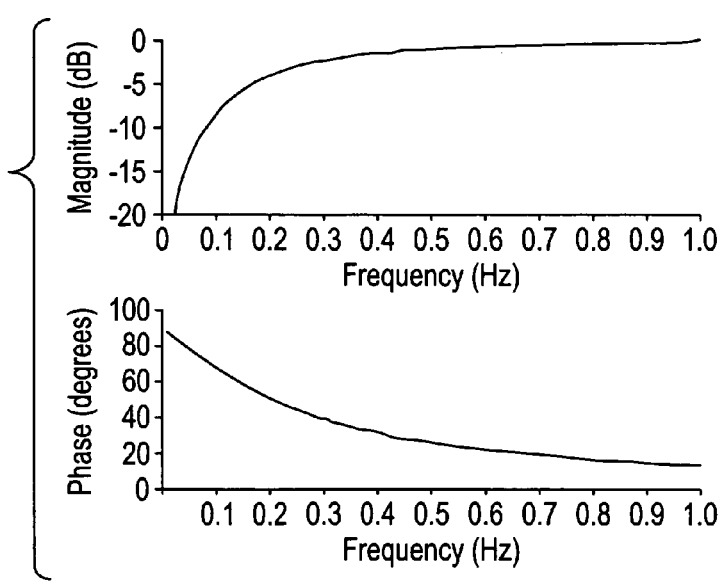
FIG. 10 is a pair of graphs illustrating the filter response of the first order active filter of FIG. 8.

Using computer analysis software, a DC level was applied to the data files shown in FIGS. 6 and 7 and a first order, digital high pass filter was applied. This filter response is equivalent to a passive RC circuit and is depicted by graphs of FIG. 10. The 0.25 Hz cut-off frequency is apparent from the −3 dB attenuation point.

Figure 11:
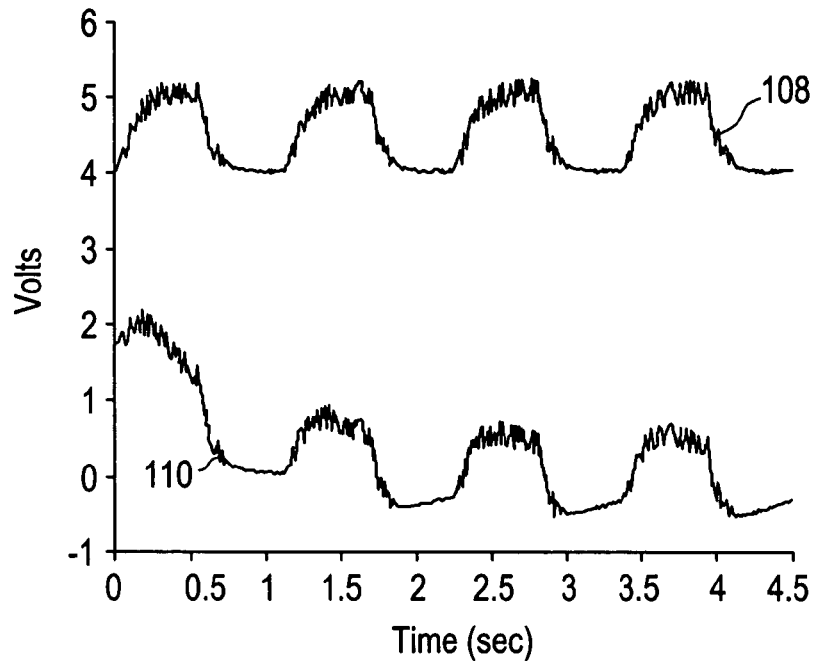
FIG. 11 is a graph illustrating raw and filtered signals from an incandescent warning lamp.
Figure 12:
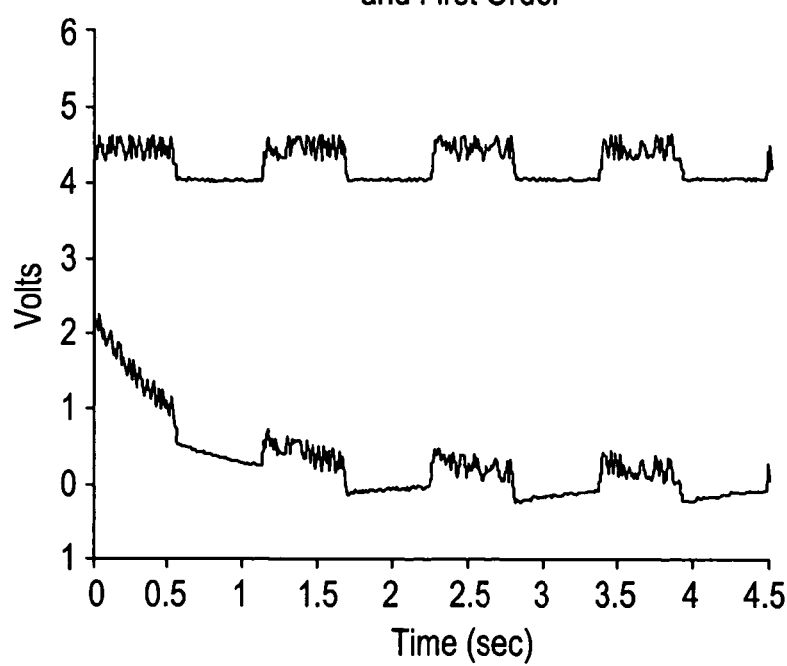
FIG. 12 is a graph illustrating raw and filtered signals from an LED warning lamp.

Raw and filtered photo sensor signals from an incandescent lamp are depicted in the graph of FIG. 11. The trace of line 108 represents the original, measured photo sensor output. The trace of line 110 is the filtered signal. Removal of the DC level and filter settling time can be readily observed. Similar results are shown for the LED lamp in FIG. 12. The data in these figures was collected at a sampling frequency of 100 Hz. It can be observed that the LED response is affected slightly by the high pass filtering.

Maintaining a sampling rate on the order of 100 Hz will afford capture of the initial rising edge of the filtered photo sensor waveform, representing the peak of the output signal.

Figure 15:
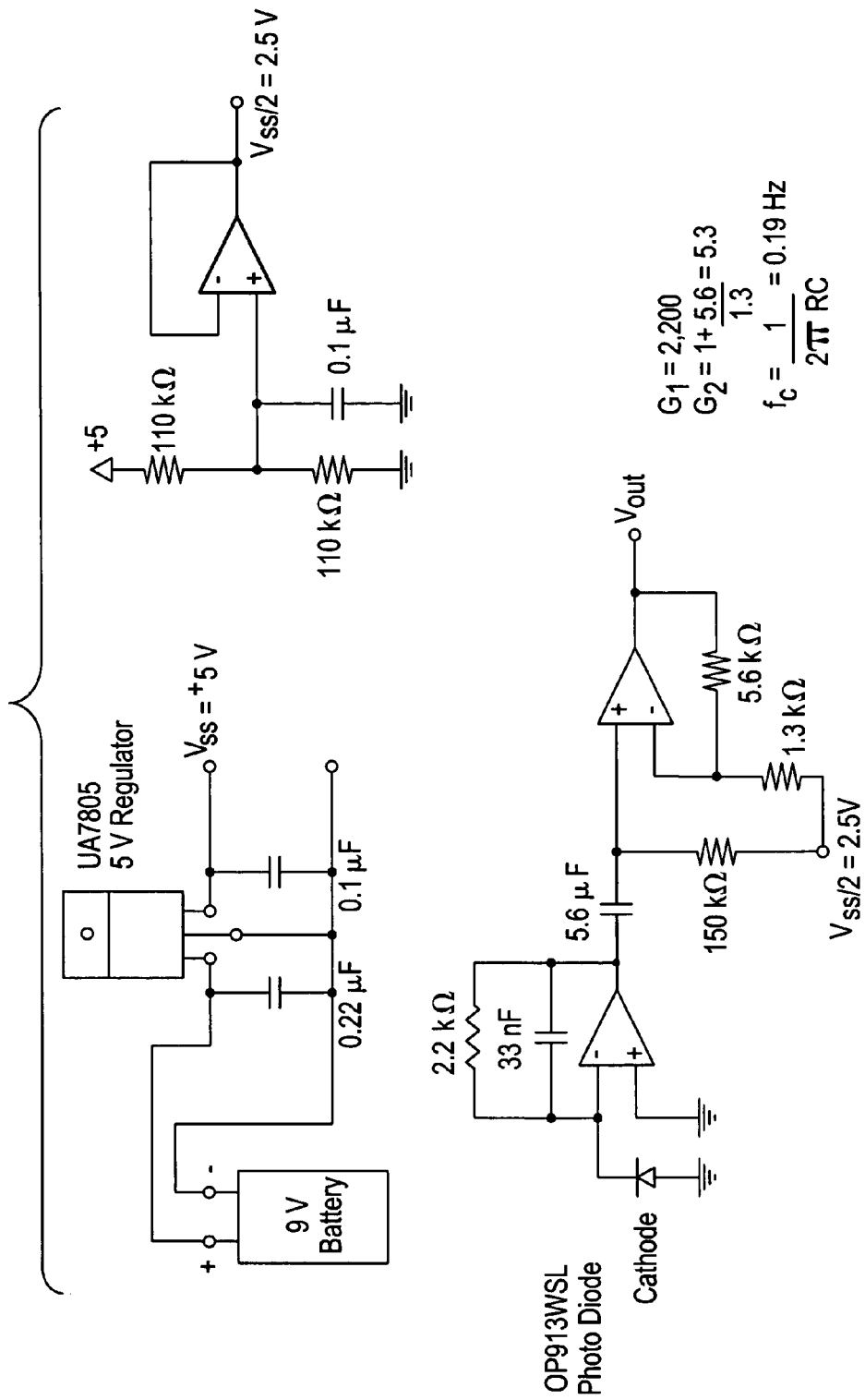
FIG. 15 is a schematic of a light sensor circuit constructed in accordance with exemplary embodiments of the present invention.

In an exemplary embodiment the flashing light sensor operates from a single, positive supply voltage, Vss. The output of the photodiode and trans-impedance amplifier is a voltage ranging from 0 to Vss. The gain of the trans-impedance amplifier is a trade-off between: (1) large gain to provide resolution of warning lamp generated photo current; and (2) small gain to avoid sunlight generated photo current from consuming the dynamic range. An active analog filter is implemented using a single supply operational amplifier and a virtual ground $\leq$Vss/2. In this fashion, the output of the filter will be a bi-polar signal ranging from 0 to Vss. Portions of the filtered, alternating signal will not be truncated (i.e., clipped) by the single supply operational amplifier and peak-to-peak voltage gain can be realized. The operational amplifier is illustrated in the circuit of FIG. 15. The analog-to-digital converter inputs will then be presented with a signal with a known DC offset. Calculation of the peak-to-peak signal can be readily accomplished and the peak-to-peak voltage value compared to nominal operation thresholds.

Realization of a first order, active, high pass filter can be accomplished via the single-supply circuit of FIG. 13. The circuit of FIG. 13 is found in the following reference: "A Single-Supply Op-Amp Circuit Collection" by Bruce Carter, Texas Instruments Application Report SLOA058, November, 2000. Gain can be added to the pass band signals using the illustrated amplifier circuit. Assuming a desired cut-off frequency 0.25 Hz, a 4.7 uF capacitor and 137 kOhm resistor serving as R1 and C1 yield $f_o$=0.247 Hz. Assuming a desired cut-off frequency 0.15 Hz, a 10 uF capacitor and 107 kOhm resistor serving as R1 and C1 yield $f_o$=0.149 Hz. Of course, it is understood that exemplary embodiments of the present invention are not limited to the aforementioned values used in the amplifier circuit of FIG. 13.

A two-stage photo sensor or sensor system for measuring the warning light output in accordance with exemplary embodiments of the present invention is shown as a block diagram in FIG. 3. The gain of stage one (trans impedance amplifier) and stage two (high pass filter) is derived in order to provided the desired output.

In an exemplary embodiment, the micro controller 98 would sample at a rate in excess of 20 Hz and perform low pass filtering to reduce noise. The micro controller would also incorporate a min/max search algorithm to determine peak-to-peak voltage of the flashing light photo sensor signal. This algorithm would further eliminate the effects of the second stage virtual ground and output bias. The algorithm of the microcontroller (e.g., min/max sampling) would be configured to determine if the signal is below a minimum light output valve, which may correspond to and inoperative light or blocked lens or alternatively if the signal is above a maximum valve, which may correspond to a broken lens of the warning lamp wherein the light output of the light emitting source is directly received by the photodiode. In other words, the algorithm would be looking for min and maximum values, calculating the difference and comparing this peak-to-peak voltage to thresholds. In an exemplary embodiment, the algorithm would look for min and max values starting after the initial settling time and over a minimum time duration greater than the shortest flash rate (e.g., 35 flash per minute).

Figure 16:
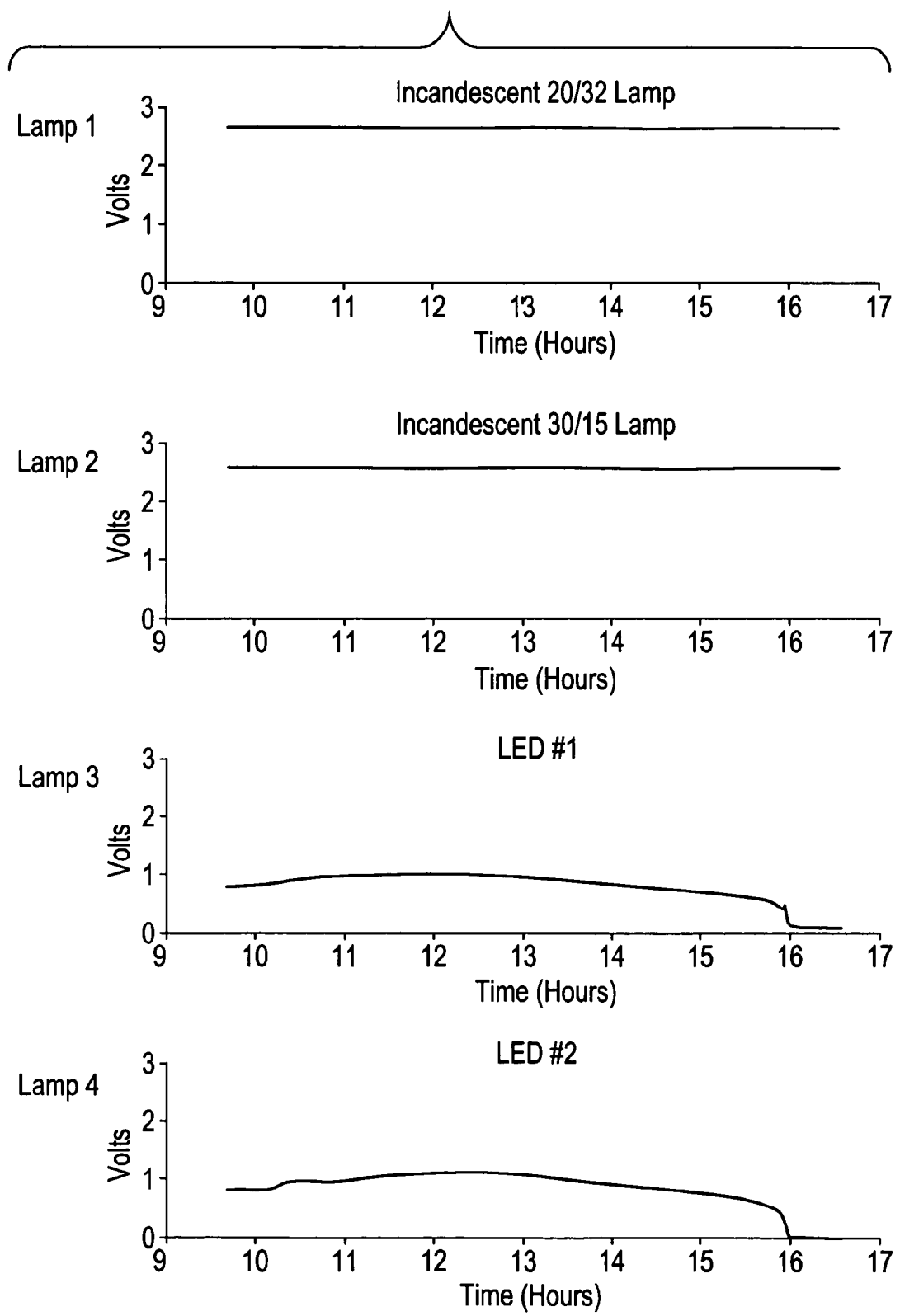
FIG. 16 contains graphs illustrating the outputs of photodiodes with filtered and unfiltered signals.

An example of a prototype circuit is illustrated in FIG. 15. Referring now to FIG. 15, a pair of prototype light sensor circuits were built and evaluated in the field. As illustrated, a high pass cut-off frequency of 0.19 Hz was implemented along with voltage gain of approximately 11,760. The prototypes were mounted in small, aluminum enclosures and connected to 0P913WSL photodiodes. The photodiodes were then positioned in an orientation to sense the light output of the warning light. For example, the positions illustrated in FIGS. 4 and 5. Referring now to the graphs of FIG. 16 the prototype high pass filter circuits of FIG. 15 were installed on two incandescent lamps (incandescent 20/32) and (incandescent 30/15) while two photo sensor circuits of FIG. 17 were used with a Harmon LED lamp and the GELCore LED lamp. Other suppliers of incandescent lamps and LED lamps or arrays include GE, Safetran and others.

Ambient sunlight data was collected from approximately 9:30 AM until 4:30 PM. The four channels from the four individual lamps were recorded at a 5 Hz sample rate. The high pass filter prototypes were installed on lamps 1 and 2. Lamps 3 and 4 were recorded using the photo sensor of FIG. 17. Descriptive statistics for each channel are summarized in table of FIG. 18. Power spectral estimates showing the frequency content of the output voltage collected on all four channels is shown by the graph of FIG. 19.

The daily variation of ambient sunlight is clearly evident in traces for lamps 3 and 4. These curves show peak sunlight levels slightly after noon and gradually decrease as the day progresses. This is primarily attributable to the position of the sensor underneath the hood of the warning light, wherein the hood will shade some of the ambient sunlight depending on the time of day. The high pass filter eliminates the very low frequency ambient sun characteristic as the traces for lamps 1 and 2 present a nearly constant average level consistent with the circuit design and virtual ground of 2.5 Volts (i.e., the traces of lamps 1 and 2 in FIG. 16). High pass filtering also significantly reduces the standard deviation.

Figure 19:
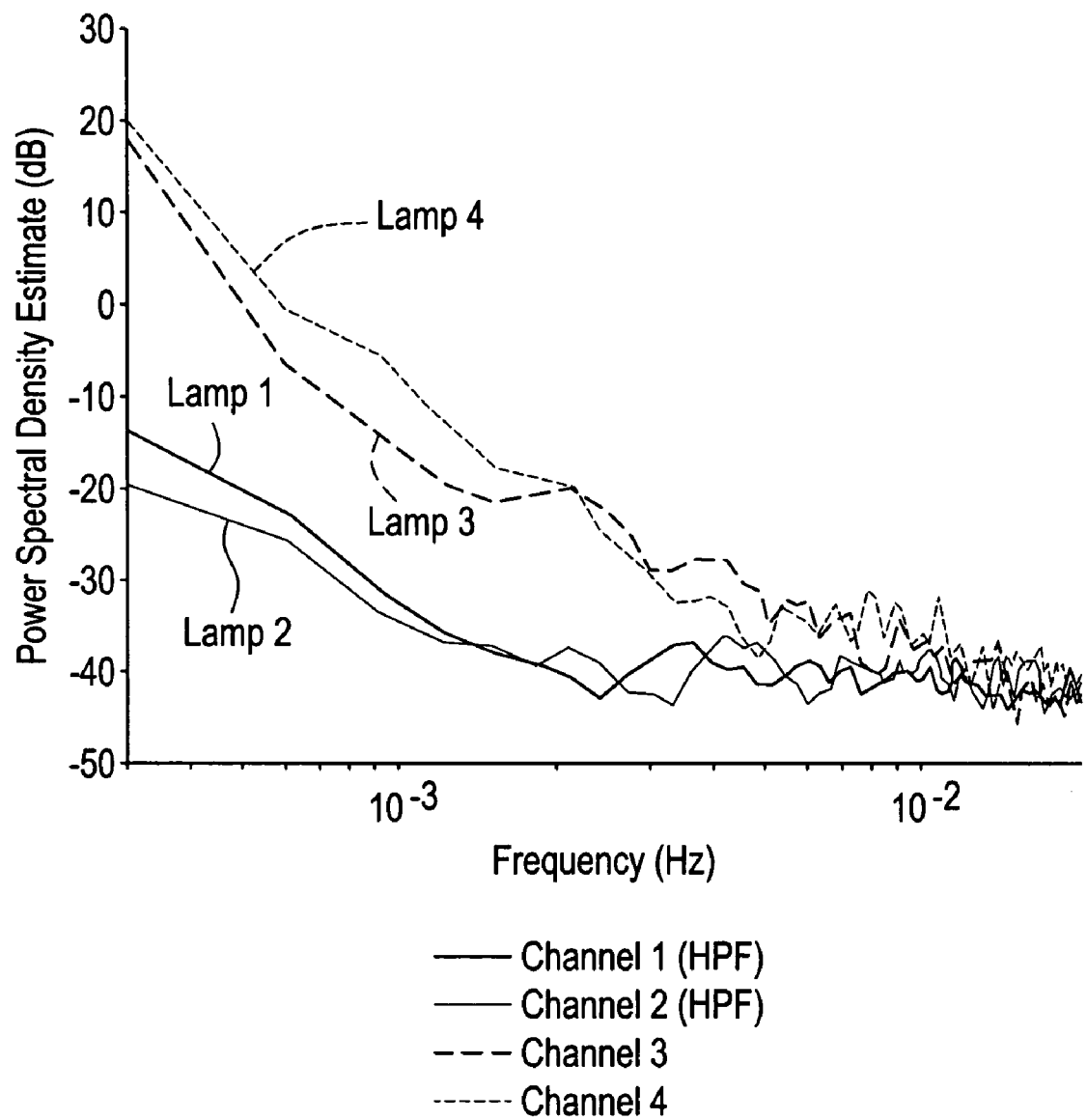
FIG. 19 is a graph illustrating estimated power spectral density of the lamps of FIGS. 16 and 18.

FIG. 19 shows estimates of the power spectral density for all four channels and validates the high pass filter circuit performance. Filtered sensor channels exhibit 3 dB of attenuation of about 0.2 Hz and greater than 20 dB attenuation for signals with frequency less than 0.001 Hertz.

In order to design the photo sensor circuits of exemplary embodiments of the present invention a Monte Carlo simulation was developed to estimate the ambient sunlight levels. The simulation was developed using Crystal Ball software and used the Bird Simple Spectral Model (Bird Simple Spectral Model documentation, software and spreadsheet implementation available via the Internet at httn://rredc.n-rel.gov/solar/models/snectral/) to estimate incident solar radiation levels. The purpose of the Monte Carlo analysis was to establish the statistical distribution on photo current from sunlight and warning lights in order to define proper gain levels for the photo sensor electronics.

The Bird Simple Spectral Model was authored by Dr. Richard Bird and Dr. Carol Riordan. The model is available for download as an Excel spreadsheet or C language source code. The Bird Model computes clear sky spectral direct beam, hemispherical diffuse, and hemispherical total irradiances on a prescribed receive plane. The receive plane can take any user defined tilt and azimuth. The model calculates irradiance density in units of Watts per square centimeter per meter (Watts*$cm^{-2}$*$\mu m^{-1)}$ at wavelengths ranging from 305 to 4000 nm. Aerosol optical depth, total precipitable water vapor and equivalent ozone depth must be specified by the user. The spreadsheet implementation contains an empirically derived ozone depth estimator for convenience. The direct beam spectral irradiance is assumed to contain the circumsolar radiation within a five degree solid angle. The Excel spreadsheet version of the Bird Simple Spectral Model, SPCTRAL2.xls, was used as the foundation of a Crystal Ball Monte Carlo analysis.

The Monte Carlo simulation also incorporated a red optical filter as a user selectable option. When enabled, the response characteristic from an optical cast plastic red color filter is applied to all photo current calculations. This specific filter used for the simulation can be found listed in the Edmunds Optical catalog. The filter response curve was manually digitized and interpolated to the wavelength values used by SPCTRAL2.xls. The response curve ends with ~90% transmission at 700 nm.

Figure 20:
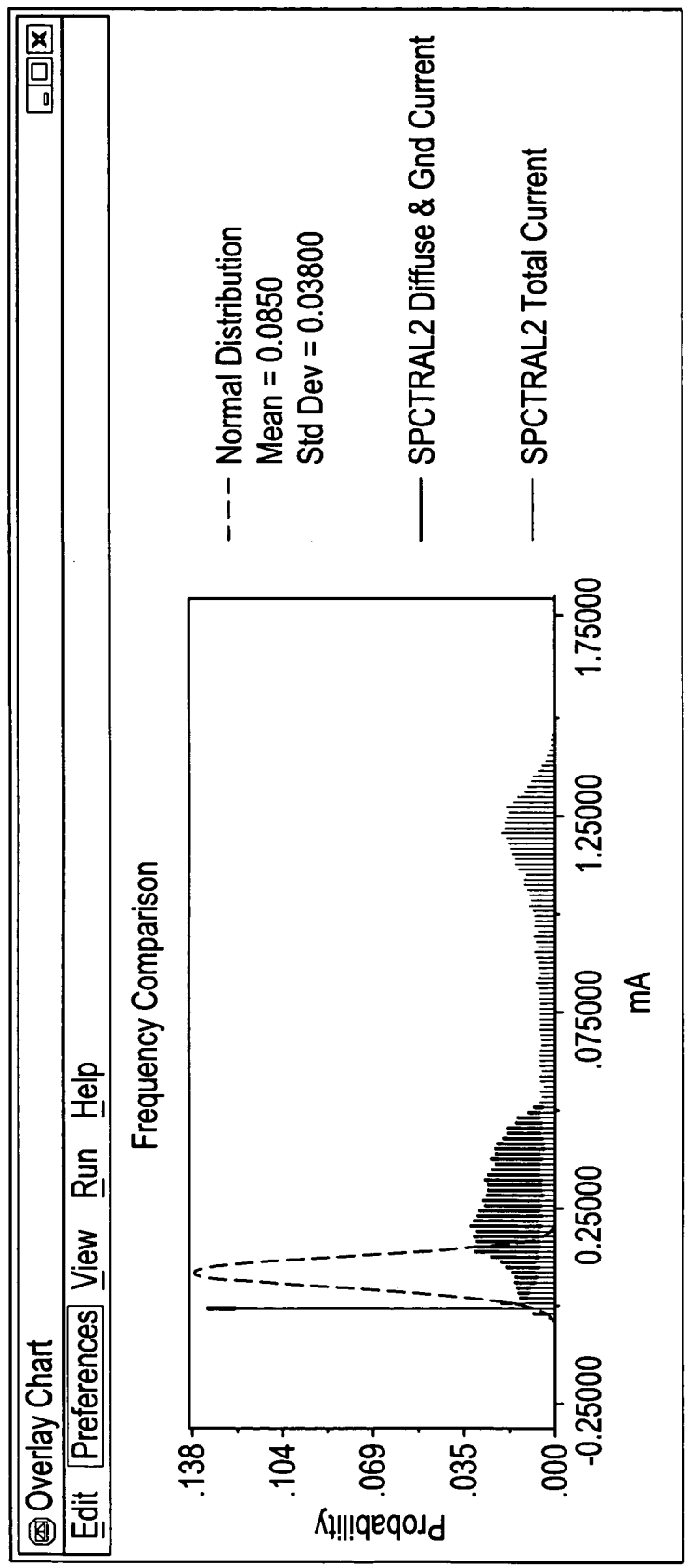
FIGS. 20–22 are graphs illustrating statistical distribution of photo currents from simulations overlaid with actual field data.
Figure 21:
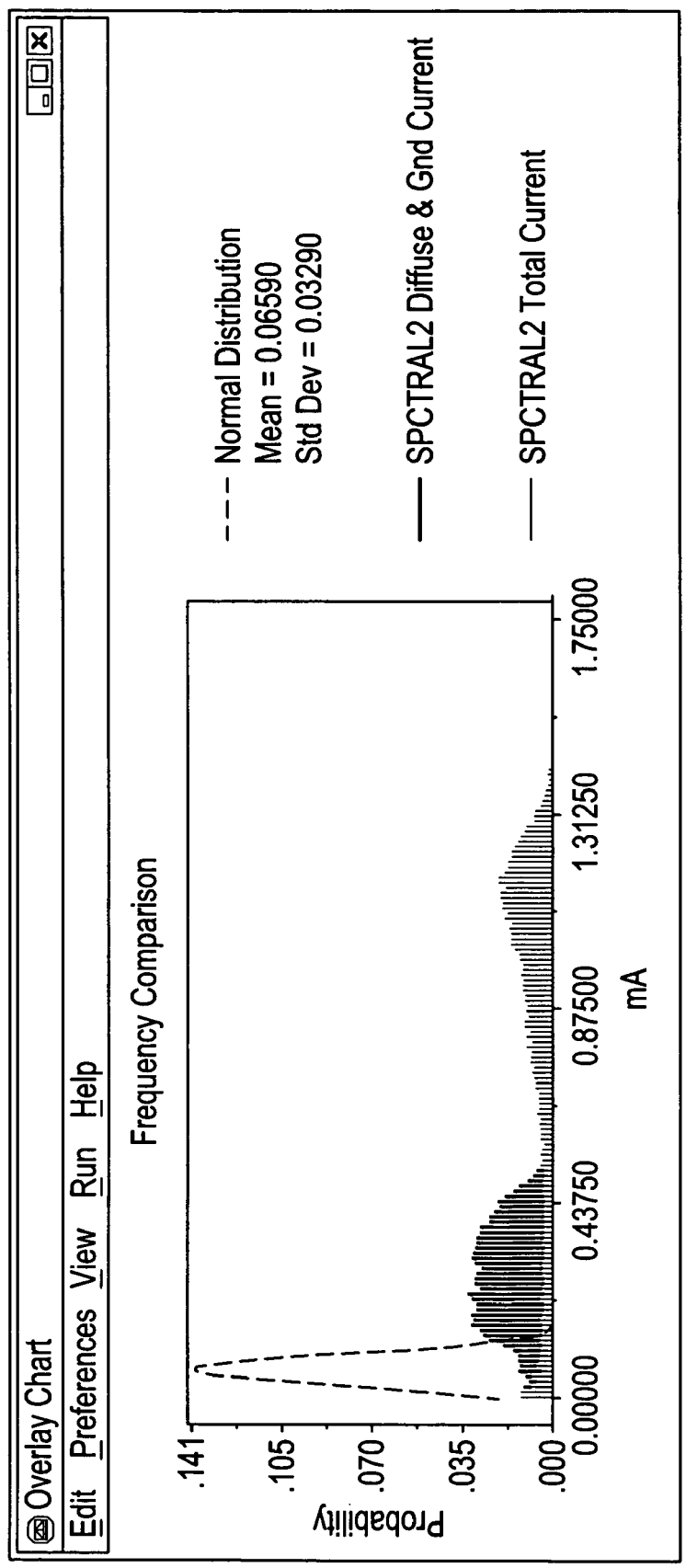
Figure 22:
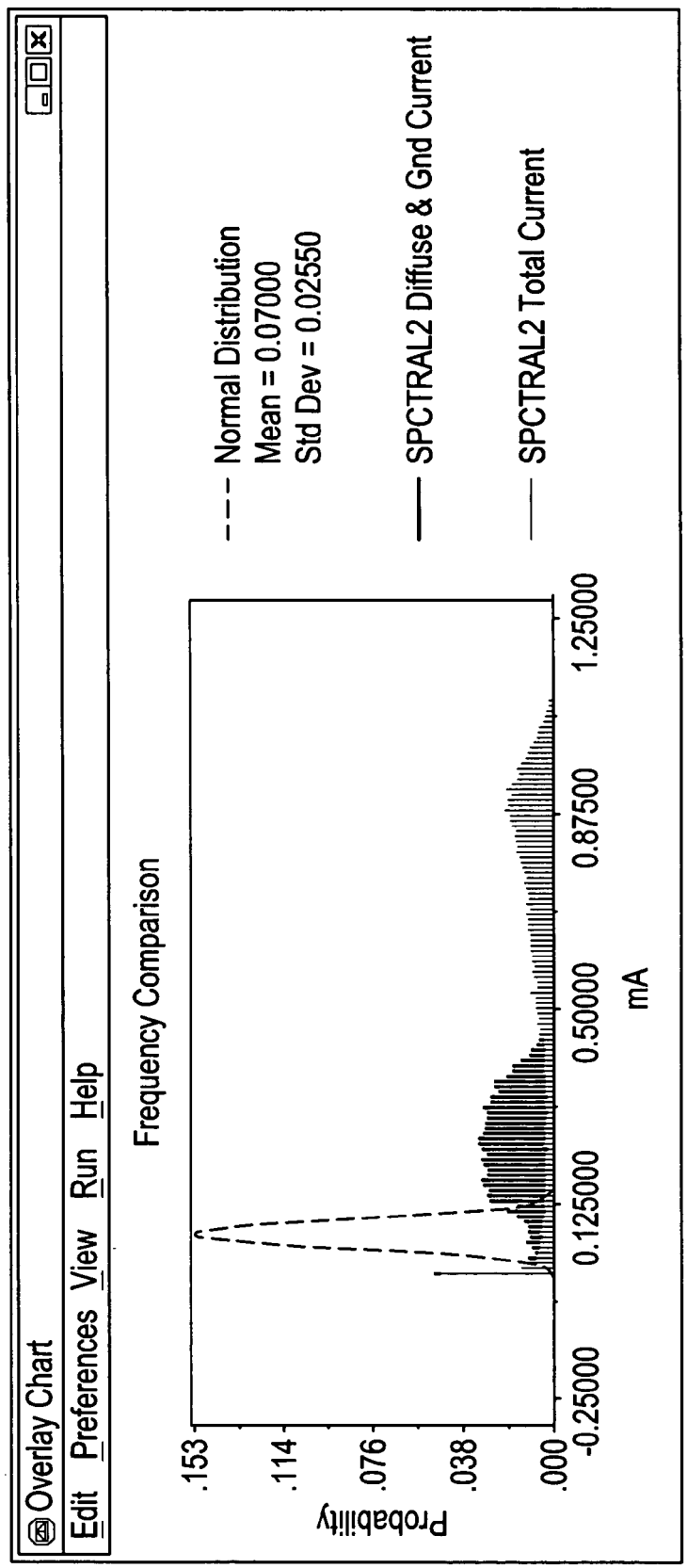

Referring now to FIGS. 20–22 the statistical distribution of photo current calculated by the Bird Model Monte Carlo simulation is overlaid with field data results. Each figure shows comparison for an individual test event and photo current distributions resulting from: (1) diffuse plus ground reflected sunlight; and (2) diffuse plus ground reflected plus direct sunlight (i.e., total current). Overlaid with these distributions is a normal distribution with mean and standard deviation values taken from field data maximum statistics. Two conclusions are noted from the comparison of the field data and the simulation, 1) the Bird Model predictions of total photo current include the direct sunlight radiation component and are skewed to levels much larger than those observed in the field and 2) the field data agrees with Bird Model predictions of photo current from diffuse and ground reflected solar components and tend towards the lower end of the distribution.

Figure 23:
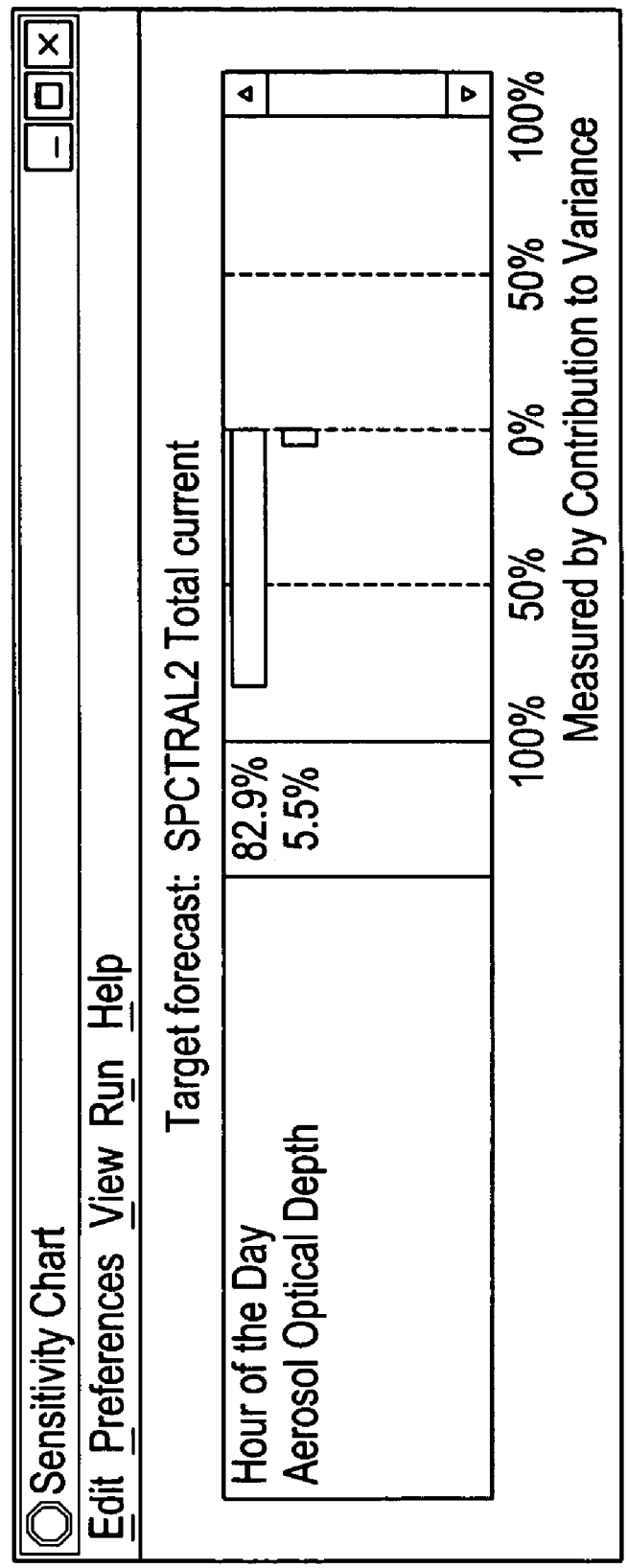
FIG. 23 is a chart illustrating the sensitivity analysis of the total photo current in simulations.

In addition, the photo current estimates which include the direct solar radiation component do not represent the field data as this direct component does not reach the photo sensor. The direct solar component achieves maximum intensity during midday. However, at midday these direct components are sufficiently blocked by the lamp's hood (FIGS. 4 and 5). During sunrise and sunset, the direct path may present an angle of incidence such that it strikes the surface of the lens. However, the direct path solar component presents a lower intensity at these times of day. Furthermore, the warning light lens presents a curved and patterned surface. These lens characteristics do not promote reflection of direct solar radiation to the photo sensor. The dependency between direct path solar radiation intensity and time of day is shown by FIG. 23 which contains a sensitivity analysis for Bird Model total photo current given 28 October field conditions. As shown, hour of the day contributes to approximately 83% of the variation in total photo-current estimated by the Bird Model simulation.

Field data also shows agreement with lower end of statistical distribution for photo current from diffuse and ground reflected solar components. Aerosol optical depth contributes approximately 57% of the photo current variance. In the Monte Carlo simulation aerosol optical depth is assigned a uniform random variable ranging from 0.05 to 0.55. These values represent clear sky conditions. A higher number indicates more aerosol particles in the atmosphere and yields less solar radiation from diffuse and ground reflected components. The tendency of field measurements towards lower photo current values can likely be attributed to aerosol optical depth levels near or exceeding the upper range of 0.55. Aerosol optical depth data is available from NASA's Aerosol Robotic Network (AERONET, http://aeronet.gsfc.nasa.gov/)). Data for the test dates collected show aerosol optical depth values as a function of wavelength and can be used to support the assumption that conditions during field testing consisted of aerosol optical depth values across the assumed 0.5 to 0.55 uniform random variable range.

The field data collected shows agreement with photo current estimates from the Bird Simple Spectral Model of diffuse and ground reflected sunlight. For these data sets, the Bird Model provides a conservatively large estimate of photo current from ambient sunlight.

Accordingly, the flashing light photo sensor electronic design is capable through simulation tests and field data. The Crystal Ball simulation results provide sufficient information to specify the gain of the transimpedance amplifier and high pass filter stages in order to prevent signal saturation. The following descriptions outline the methodology used to derive these gain settings.

The trans-impedance amplifier (Stage 1) was designed in accordance with the following formulas.

Given the following input parameters:

| | |
|---|---|
| Single sided power supply available for this stage, | $V_{ss}$ |
| Sunlight photo current (diffuse + ground reflected) mean, | $\eta_{Sun}$ |
| Sunlight photo current (diffuse + ground reflected) standard deviation, | $\sigma_{Sun}$ |
| Mean photo current from incandescent lamps[8], | $\eta_{Lamp}$ |
| Standard deviation of photo current from incandescent lamps, | $\sigma_{Lamp}$ |
| Portion of full voltage range permissible (i.e. fraction of Vss), | $\%_{Vss}$ |

ηLamp assumes incandescent lamp generated photo current is greater than that of LED lamps. The mean (ηLamp) and standard deviation (σLamp) should reflect the maximum values from all lamps.

A calculation of the maximum photo current from sunlight derived from ground and diffuse solar components was made:

$$I_{Sun} = (\eta_{Sun} + 3*\sigma_{Sun})$$

A calculate of the maximum photo current from warning lamps was then made:

$$I_{Lamp} = (\eta_{Lamp} + 3*\sigma_{Lamp})$$

Then a calculation of the maximum gain represented by the feed back resistor $R_f$ was made:

$$R_f \leq (\%_{Vss} * V_{ss})/(I_{Lamp} + I_{Sun})$$

Then the high pass filter (Stage 2) was designed in accordance with the following formulas.

Given the following input parameters:

| | |
|---|---|
| Virtual ground for active filter circuit, | $V_{vg}$ |
| Reserved portion of A/D converter voltage range, | $VR_{A2D}$ |
| A/D converter maximum input voltage, | $V_{A2D\ Max}$ |
| A/D converter minimum input voltage, | $V_{A2D\ Min}$ |
| High pass filter −3 dB cut-off frequency (Hz), | $F_{-3db}$ |
| Number of bits in A/D converter, | $N_{bits}$ |

A calculation of the voltage limits for output of high pass filter was made:

Upper voltage limit=$V_{2\ upper} = V_{A2D\ Max} - VR_{A2D}$

Lower voltage limit=$V_{2\ lower} = V_{A2D\ Min} + VR_{A2D}$

A calculation of the peak output voltage range for stage 2 was then made:

$$V_2 out\ peak = \text{minimum}\ \{V_2 upper - V_{vg},\ V_{vg} - V_{2\ lower}\}$$

A calculate of the maximum warning lamp generated peak-to-peak output voltage from stage 1 was made:

$$V_{1\ Lamp\ pk-pk} = R_f * I_{Lamp}$$

Figure 24:
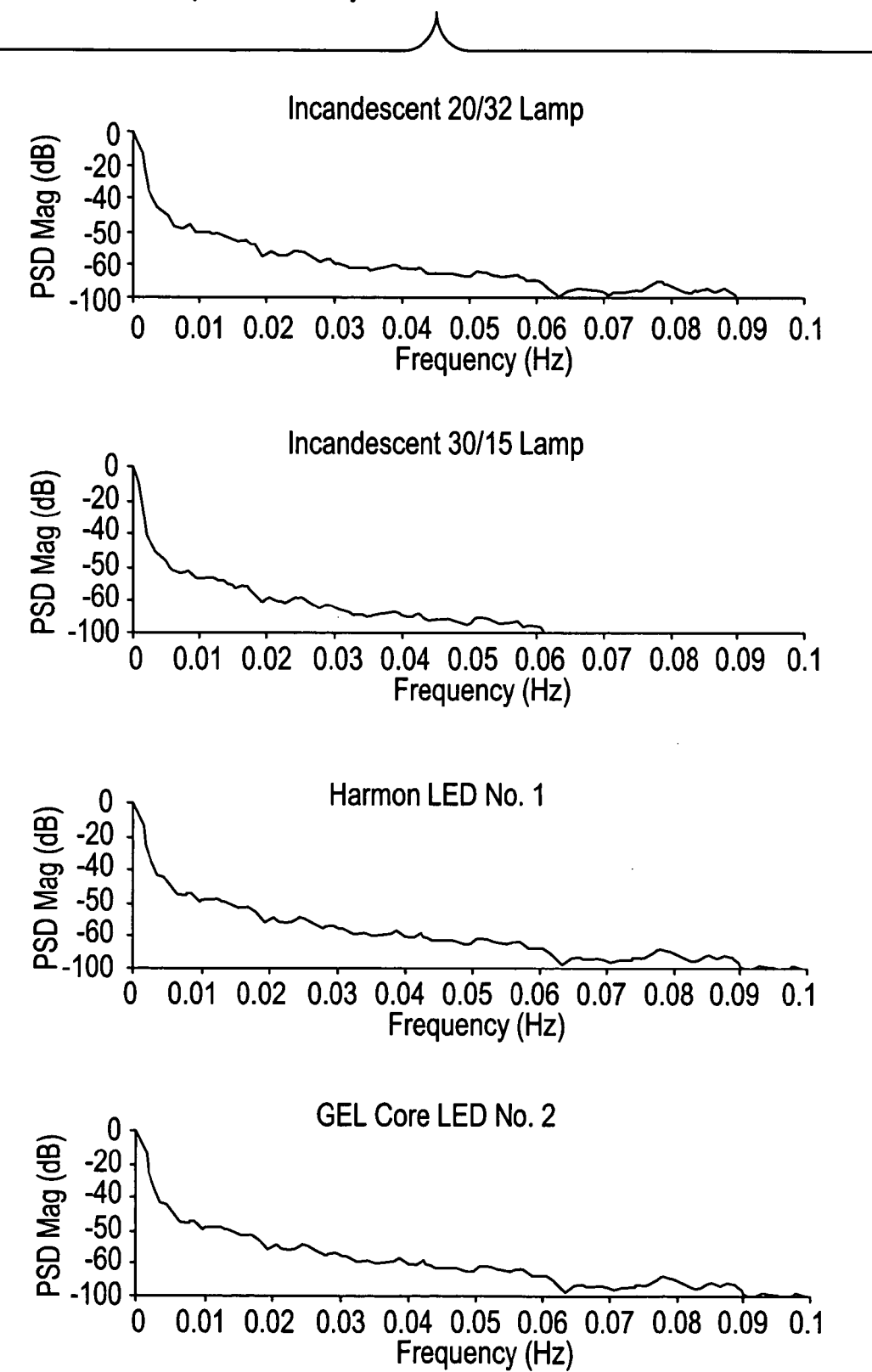
FIGS. 24 and 25 comprise charts illustrating power spectral density estimates of various warning lamps.
Figure 25:
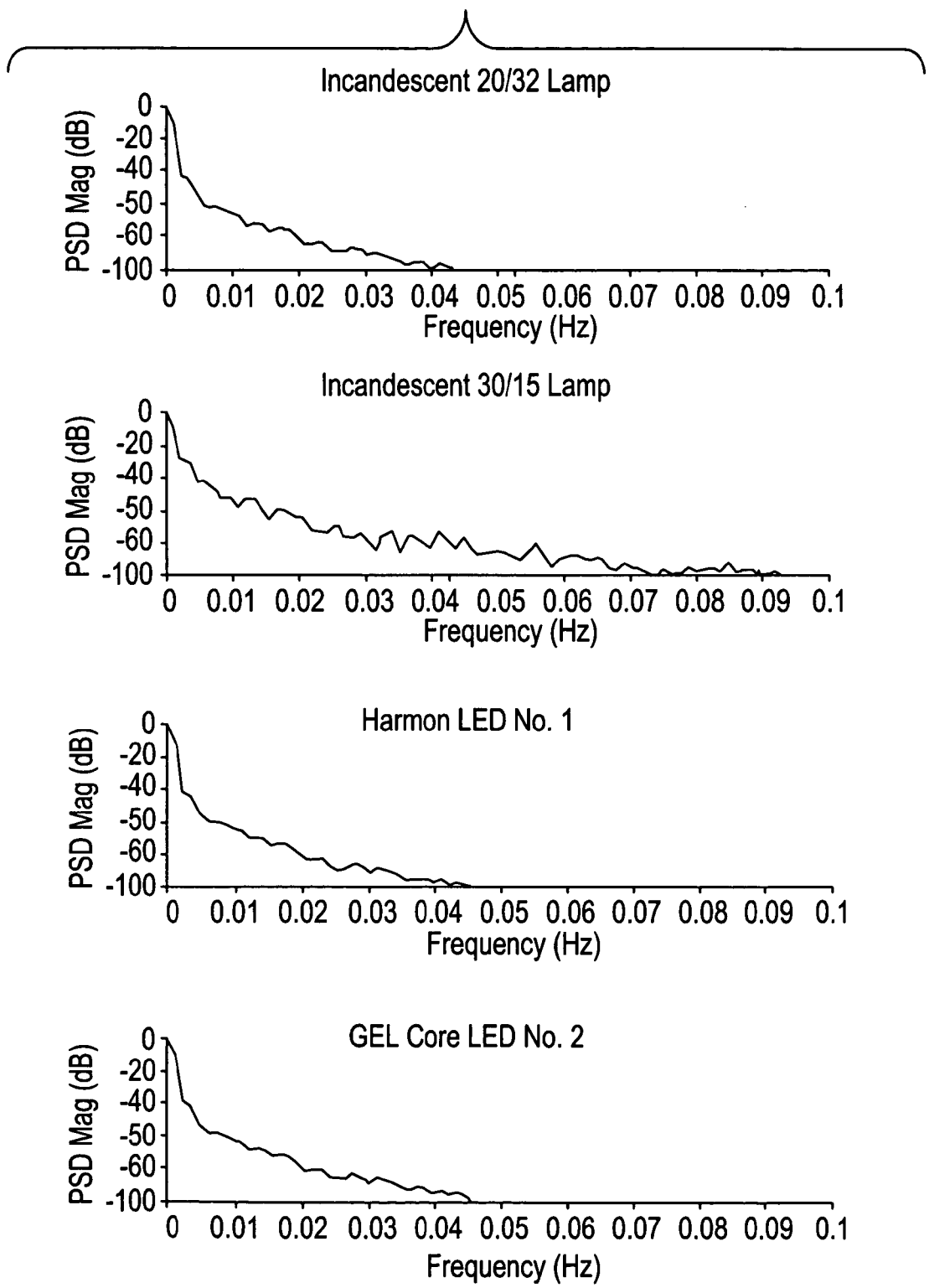

Then a calculation of the high pass filter attenuation at 0.005 Hertz as a linear (not logarithmic) value was made. This represents minimum attenuation experienced by the sunlight DC level. FIGS. 24 and 25 show that above 0.005 Hz, ambient sunlight spectra falls off rapidly to values −60 dB or more below the DC level.

$$RC = \frac{1}{(2\pi \cdot F_{-3db})}$$

$$\alpha_{0.005\ Hz} = \frac{2\pi \cdot (0.005) \cdot RC}{\sqrt{1 + [2\pi \cdot (0.005) \cdot RC]^2}}$$

Then a calculation of the stage 2 pass band voltage gain was made:

$$G_2 = \frac{V_{2\ out\ peak}}{\left(\frac{V_{1\ Lamp\ pk-pk}}{2}\right) + \left(\frac{\alpha_{0.005} \cdot R_f \cdot I_{Sun}}{2}\right)}$$

Peak-to-peak voltage presented to the ND inputs can be readily calculated by multiplication of lamp photo current by $R_f$ and $G_2$. The corresponding ND counts can also be calculated by application of a scale factor corresponding to bits/volt=$(2^{N_{bit}})/(V_{A2D\ Max} - V_{A2D\ Min})$.

In summation, analysis of ambient sunlight photo sensor data reveals frequency components <0.005 Hz. Specifically, vertical and horizontal shadow angles 40.6 and 23.2 degrees, respectively, lead to direct illumination of the lamp face. However, this data also shows that the direct sun rays at sunset during autumn are on the same order as reflected sunlight from the ground during early afternoon.

Application of an electronic, high pass filter provides a low complexity approach to mitigating the effects of ambient sunlight. A dual operational amplifier package can be used for both trans-impedance and filter circuits. Only a few passive components are required to separate the flashing warning light photo current from the near-static sunlight. In addition, this filter can provide the required gain. A first order, high pass filter design provides required frequency separation with minimal settling time latency.

Monte Carlo simulation of solar and warning lamp spectral irradiance provides sufficient information to specify gain levels for the two stage photo sensor. This simulation captures numerous sources of variation related to light source and reception. Application of a red color filter is also included as a simulation option. Agreement is found between ambient sunlight photo sensor measurements and photo current estimates from ground and diffuse solar model components.

Following the conservative design methodology defined herein, a two stage photo sensor with trans-impedance amplifier and high pass filter are specified. These circuits afford resolution of incandescent and LED lamp upper and lower specification limits in excess of 80 and 390 A/D counts, respectively. This is accomplished without red color filtering of the incident light sources.

Alternatively, other methods are capable of being employed to remove the nearly static, ambient sunlight components from the photo sensor signal. One alternative embodiment contemplates the injection of an opposing DC current to the trans-impedance amplifier input stage along with the photodiode current. This current injection would cancel the DC current from ambient sunlight. A comparator could be use to recognize DC signal level above a threshold. When exceeded, the comparator output could enable a constant current source, such as an LM334Z device. Such a device is illustrated schematically by box 120 in FIG. 3. In addition, such an alternative requires few components and is low in incremental cost.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An operational status detection system for a railroad warning device having a warning light, comprising:
   a photodiode configured to generate a signal corresponding to a light output of the warning light of the railroad warning device;
   an amplifier for increasing a signal strength of said signal and providing an output corresponding to said signal;
   a filter receptive to said output and configured to only allow portions of said output corresponding to the light output of the warning light to be presented as an output signal of the warning light, wherein a portion of said output corresponding to ambient sunlight is filtered by said filter; and
   a microcontroller receptive to said output signal and for comparing said output signal to at least one threshold value, said at least one threshold value corresponding to an acceptable light output of the warning light.

2. The operational status detection system of claim 1, wherein said output signal is an analog signal and said microcontroller further comprises an analog-to-digital converter receptive to said analog signal and for converting said analog signal into a digital signal.

3. The operational status detection system of claim 1, further comprising an optical filter that limits radiation received by the photodiode to a set of wavelengths corresponding to a color of said light output of the warning light, wherein the set of wavelengths is in the range of about 380–780 nanometers.

4. The operational status detection system of claim 3, wherein the set of wavelengths is in the range of about 650–780 nanometers.

5. The operational status detection system of claim 1, wherein said filter is a high pass filter that effectively eliminates a portion of said signal of said photodiode that is attributable to ambient sunlight.

6. The operational status detection system of claim 2, wherein said microcontroller provides an operational status signal to a remote monitoring system, wherein said operational status signal indicates whether the light output of the warning light is below an acceptable level.

7. The operational status detection system of claim 2, wherein said microcontroller provides an operational status signal to a remote monitoring system, wherein said operational status signal indicates whether the light output of the warning light is outside a range corresponding to an acceptable level of light, said range defining an upper limit and a lower limit of said acceptable level of light.

8. The operational status detection system of claim 7, wherein said filter is a high pass filter that effectively eliminates a portion of said signal of said photodiode that is attributable to ambient sunlight.

9. The operational status detection system of claim 1, wherein said amplifier is a transimpedance amplifier configured to convert said signal of said photodiode from current to voltage and increase said signal strength of said signal of said photodiode by a predetermined value, said predetermined value being less than a value that would saturate said output being provided to said filter.

10. The operational status detection system of claim 1, wherein said signal of said photodiode is a current output.

11. The operational status detection system of claim 1, wherein said filter is a high pass filter being configured to prevent portions of said output having a frequency of less than 0.005 Hz from passing through said high pass filter.

12. The operational status detection system of claim 11, wherein said high pass filter effectively eliminates a portion of said signal of said photodiode that is attributable to ambient sunlight.

13. The operational status detection system of claim 1, wherein the warning light is a flashing warning light.

14. The operational status detection system of claim 1, wherein the warning light comprises an incandescent light source.

15. The operational status detection system of claim 1, wherein the warning light comprises an array of light emitting diodes (LEDs).

16. An operational status detection system for a railroad warning device having a warning light, comprising:
   a plurality of photodiodes, each of said plurality of photodiodes being configured to generate a signal corresponding to a light output of the warning light of the railroad warning device;
   an amplifier for each of said plurality of photodiodes, said amplifier being configured to increase a strength of said signal and provide an output corresponding to said signal;
   a filter circuit for each of said plurality of photodiodes, said filter circuit comprising a high pass filter for receiving said output of said amplifier of each of said plurality of photodiodes, said high pass filter being configured to only allow portions of said output of said amplifier of each of said plurality of photodiodes corresponding to the light output of the warning light to be presented as an output signal of the warning light, wherein a portion of said output corresponding to ambient sunlight is filtered by said filter circuit; and
   a microcontroller receptive to said output signals of the warning light and for comparing said output signals to at least one threshold value, said at least one threshold value corresponding to an acceptable light output of the warning light.

17. The operational status detection system of claim 16, further comprising a summing amplifier, said summing amplifier being configured to receive said output signals of the warning light and provide a combined output corresponding to said output signals of the warning light, said combined output being a weighted linear combination of said output signals of the warning light, wherein said combined output is provided to said microcontroller and wherein said microcontroller is configured to compare said combined output to at least one threshold value, said at least one threshold value corresponding to an acceptable light output of the warning light.

18. The operational status detection system of claim 17, wherein said filter circuit is a plurality of filter circuits for each of said plurality of photodiodes wherein said plurality of filters circuits provide output signals of the warning light to said summing amplifier.

19. The operational status detection system of claim 17, wherein said filter circuit is a single filter circuit configured to receive said combined output and provide said output signal to said microcontroller.

20. The operational status detection system of claim 16, wherein said filter circuit is a plurality of filter circuits for each of said plurality of photodiodes wherein said plurality of filters circuits provide output signals of the warning light to said microcontroller.

21. The operational status detection system of claim 20, wherein said output signals are analog signals and said microcontroller further comprises an analog-to-digital converter for converting said analog signals into digital signals.

22. The operational status detection system of claim 16, wherein said microcontroller provides an operational status signal to a remote monitoring system, wherein said operational status signal indicates whether the light output of the warning light is outside a predetermined range of acceptable light levels.

23. The operational status detection system of claim 16, wherein said amplifier is a transimpedance amplifier configured to convert said signals of said plurality of photodiodes from current to voltage and increase the signal strength of said signals of said plurality of photodiodes by a predetermined value, said predetermined value being less than a value that would saturate the output being provided to said filter circuit.

24. The operational status detection system of claim 23, wherein said filter circuit effectively eliminates a portion of said signal of said photodiode that is attributable to ambient sunlight.

25. The operational status detection system of claim 17, wherein said filter circuit effectively eliminates a portion of said signal of said photodiode that is attributable to ambient sunlight.

26. The operational status detection system of claim 16, further comprising an optical filter that limits radiation received by each of said plurality of photodiodes to a set of wavelengths corresponding to a color of the warning light, wherein the set of wavelengths is in the range of about 380–780 nanometers.

27. The operational status detection system of claim 26, wherein the set of wavelengths is in the range of about 650–780 nanometers.

28. A method for remotely monitoring a light output of a warning light of a railroad crossing warning system, comprising:
   sampling the light output of the warning light with a photodiode, said photodiode generating a signal corresponding to an output current of said photodiode;
   filtering said signal corresponding to said output current with a filter, wherein ambient sunlight is filtered from said signal to provide a filtered signal;
   comparing said filtered signal to an acceptable threshold value to generate an operational status signal; and
   providing said operational status signal to a remote monitoring system.

29. The method as in claim 28, wherein said filter is a high pass filter configured to block signals having a frequency less than 0.005 Hz in value.

30. The method as in claim 28, further comprising: amplifying said signal corresponding to the output current of said photodiode, wherein an amplitude of said signal is increased without saturating said filter.

31. The method as in claim 28, further comprising: eliminating undesired wavelengths of light from being sampled by said photodiode, wherein only wavelengths corresponding to a color of the light output of the warning light are allowed to be sampled by said photodiode.

32. A warning light for a railroad crossing, comprising:
a housing for a light emitting device;
a roundel secured to said housing, said roundel being positioned in front of said light emitting device to provide an illuminated surface of the warning light;
a shroud extending from said housing and said roundel;
a sensor secured to said shroud and being positioned to detect light from said illuminated surface wherein said sensor is configured to provide an operational status signal of the warning light, said sensor comprising;
a photodiode configured to generate a signal corresponding to a light output of said illuminated surface;
an amplifier for increasing a signal strength of said signal and providing an output corresponding to said signal;
a filter receptive to said output and configured to only allow portions of said output corresponding to said light output of said illuminated surface to be presented as an output signal of the warning light; and
a microcontroller receptive to said output signal and for comparing said output signal to a threshold value, said threshold value corresponding to an acceptable light output of said illuminated surface.

33. The warning light as in claim 32, wherein said output signal is an analog signal and said microcontroller further comprises an analog-to-digital converter for converting said analog signal into a digital signal.

34. The warning light as in claim 33, wherein said microcontroller provides an operational status signal to a remote monitoring system, wherein said operational status signal indicates whether the light output of the warning light is below an acceptable level.

35. The warning light as in claim 33, wherein said microcontroller provides an operational status signal to a remote monitoring system, wherein said operational status signal indicates whether the light output of the warning light exceeds an acceptable level.

36. The warning light as in claim 32, wherein said amplifier is a transimpedance amplifier configured to convert said signal of said photodiode from current to voltage and increase the signal strength of said signal of said photodiode by a predetermined value, said predetermined value being less than a value that would saturate the output being provided to said filter.

37. The warning light as in claim 36, wherein said filter is a high pass filter that effectively eliminates a portion of said signal of said photodiode that is attributable to ambient sunlight.

38. The warning light as in claim 37, further comprising an optical wavelength filter positioned to filter radiation received by said photodiode, said optical filter which limits radiation received by the photodiode to a set of wavelengths corresponding to the color of said illuminated surface, wherein the set of wavelengths is in the range of about 380–780 nanometers.

39. The warning light as in claim 38, wherein the set of wavelengths is in the range of about 650–780 nanometers.

* * * * *